US012332382B2

United States Patent
Maidt et al.

(10) Patent No.: US 12,332,382 B2
(45) Date of Patent: Jun. 17, 2025

(54) MOBILE APPARATUS AND METHOD FOR CAPTURING AN OBJECT SPACE

(71) Applicant: NavVis GmbH, Munich (DE)

(72) Inventors: Mandolin Maidt, Munich (DE); Andreas Goebel, Munich (DE); Stefan Romberg, Munich (DE); Georg Schroth, Munich (DE); Michael Jaschke, Munich (DE); Prashant Doshi, Munich (DE); Sarah Godoj, Munich (DE); Hernando Samuel Pinzon Holguin, Munich (DE); Matthias Wagner, Munich (DE); Humberto Alvarez-Heredia, Munich (DE); Neeti Tyagi, Munich (DE); Paul Zeller, Munich (DE); Christian Werner, Munich (DE)

(73) Assignee: NavVis GmbH, Munich (DE)

( * ) Notice: Subject to any disclaimer, the term of this patent is extended or adjusted under 35 U.S.C. 154(b) by 1022 days.

(21) Appl. No.: 17/045,259

(22) PCT Filed: Apr. 8, 2019

(86) PCT No.: PCT/EP2019/058843
§ 371 (c)(1),
(2) Date: Oct. 5, 2020

(87) PCT Pub. No.: WO2019/193207
PCT Pub. Date: Oct. 10, 2019

(65) Prior Publication Data
US 2021/0132195 A1 May 6, 2021

(30) Foreign Application Priority Data
Apr. 6, 2018 (DE) ..................... 10 2018 108 141.3

(51) Int. Cl.
*G01S 7/481* (2006.01)
*G01S 7/48* (2006.01)
*G01S 17/89* (2020.01)

(52) U.S. Cl.
CPC .......... *G01S 7/4817* (2013.01); *G01S 7/4808* (2013.01); *G01S 7/4813* (2013.01); *G01S 17/89* (2013.01)

(58) Field of Classification Search
CPC .... G01S 7/4808; G01S 7/4813; G01S 7/4815; G01S 7/4817; G01S 17/42; G01S 17/86; G01S 17/88; G01S 17/89; G01S 17/931
See application file for complete search history.

(56) References Cited

U.S. PATENT DOCUMENTS

| | | | | |
|---|---|---|---|---|
| 2010/0195086 A1* | 8/2010 | Ossig | ...................... | G01S 7/491 356/5.01 |
| 2011/0215261 A1* | 9/2011 | Lyslo | ........................ | A61L 2/10 250/492.1 |

(Continued)

FOREIGN PATENT DOCUMENTS

| CN | 104536255 A | * | 4/2015 |
|---|---|---|---|
| DE | 10 2004 050682 A1 | | 6/2005 |

(Continued)

OTHER PUBLICATIONS

Vosselman, George, Design of an indoor mapping system using three 2D laser scanners and 6 DOF SLAM, 2014, ISPRS Annals of the Photogrammetry, Remote Sensing and Spatial Information Sciences, vol. II-3, pp. 173-179 (Year: 2014).*

(Continued)

*Primary Examiner* — Yuqing Xiao
*Assistant Examiner* — Benjamin Richard Hebert
(74) *Attorney, Agent, or Firm* — Paul D. Bianco; Katharine Davis Wong; Fleit Intellectual Property Law

(57) ABSTRACT

A mobile apparatus for capturing an object space includes a frame and at least one single scanner mounted on the frame (Continued)

and a multiple scanner mounted on the frame above the single scanner. This multiple scanner has a plurality of emission units integrated in one component, a receiver for detecting reflected rays, and a scanning device for changing the emission directions of the signal beams of the emission units. Furthermore, the mobile apparatus has an evaluation device which is designed to generate and output in real time, at least from the reflected rays detected by the receiver, a graphical representation of those areas of the object space through which the mobile apparatus can be moved and/or has been moved. Finally, the mobile apparatus has a data interface designed to output data to a memory device for post-processing. A corresponding method for capturing an object space is also disclosed.

24 Claims, 16 Drawing Sheets

(56) References Cited

U.S. PATENT DOCUMENTS

| | | | | |
|---|---|---|---|---|
| 2015/0160347 A1* | 6/2015 | Zweigle | ................ | G05D 1/024 |
| | | | | 356/5.01 |
| 2017/0067739 A1* | 3/2017 | Siercks | .................... | G06T 7/97 |
| 2017/0123066 A1* | 5/2017 | Coddington | ............ | G01S 17/50 |
| 2017/0269215 A1 | 9/2017 | Hall et al. | | |
| 2018/0290748 A1* | 10/2018 | Corban | ................ | G05D 1/0088 |
| 2020/0051443 A1* | 2/2020 | Zhao | ...................... | G06V 20/17 |
| 2020/0209394 A1* | 7/2020 | Mark | .................... | G01S 7/4813 |

FOREIGN PATENT DOCUMENTS

| | | |
|---|---|---|
| DE | 10 2011 121115 A | 6/2012 |
| EP | 2199828 A2 | 6/2010 |
| EP | 2388615 A1 | 11/2011 |
| EP | 2913796 A1 | 9/2015 |
| EP | 3228985 A | 10/2017 |

OTHER PUBLICATIONS

International Search Report dated Jul. 11, 2019 for PCT/EP2019/058843 (English translation).
Written Opinion for PCT/EP2019/058843, filed Apr. 8, 2019.
G. Vosselman, "Design of an indoor mapping system using three 2D laser scanners and 6 DOF SLAM" Isprs Annals of Photogrammetry, Remote Sensing and Spatial Information Sciences, DE, vol. II-3, No. 3, Aug. 7, 2014 (Aug. 7, 2014), pp. 173-179.
International Preliminary Report on Patentability dated Oct. 6, 2020 with Written Opinion, for PCT/EP2019/058843 filed Apr. 8, 2019 (English translation).

* cited by examiner

MOBILE APPARATUS AND METHOD FOR CAPTURING AN OBJECT SPACE

FIELD OF THE INVENTION

The present invention relates to a mobile apparatus for capturing an object space. Furthermore, the invention relates to an apparatus for capturing an object space with a mobile apparatus.

BACKGROUND

Various capture systems are known for the capturing of object spaces inside buildings and outdoors. The present invention relates in particular to the capture of an object space within a building. Such a system is described for example in EP 2 913 796 A1. In this case a laser scanner is used in combination with a plurality of cameras. A point cloud is generated from the signals of the laser scanner and the images of the cameras, from which point cloud a three-dimensional building model is created.

There exist comparable outdoor capture systems that can be mounted on vehicles and aircraft. In these systems, the referencing of the captured data to a coordinate system is usually done by way of a position determination using satellite navigation systems.

Inside buildings, this possibility of position determination does not exist, as there is no signal connection available there to the navigation satellites. In addition, the position determination is not accurate enough for the capturing of an object space by means of satellite navigation. For this reason, the position determination in outdoor areas also utilises radodometry, laser odometry or inertial navigation (INS). Satellite navigation plays a role in georeferencing and reducing long-term drift.

For the position determination inside buildings during the mobile capture of object spaces, it is necessary in particular to perform the position determination in real time as quickly as possible in order to provide the system operator with a real-time representation of the capture process in the surrounding area on a screen, so that he can control the capture process in such a way that the interior of the building is scanned as completely as possible and in high quality.

Furthermore, it is necessary that the most precise possible downstream position determination over time, i.e. the determination of the trajectory when capturing the object space, is possible in the post-processing. Only in this case can the continuously captured measurements of the laser scanners and the panoramic images, which are usually captured at a distance of a few metres each, be combined to form a precise, consistent 3D model of the building, for example by creating a point cloud or a polygon mesh.

The various methods for determining position and trajectories are discussed further below. In the following, a presentation of the data capture methods and application scenarios is firstly provided:

In the capture of point clouds with the aid of laser scanners, systems are generally used in which a laser beam is emitted by a mirror rotating about an axis in a plane in space. Alternatively, solid-state lasers without moving parts can be used to generate a rotating laser beam.

The data supplied here usually contain for each data set (point of the point cloud) the time stamp of the emitted laser pulse with the corresponding angular position within the rotation axis. Furthermore, each data set contains one or more values derived from one or more successively received reflection signals and indicating the distance of the reflecting surfaces in the direction of the emitted beam as well as the associated reflection intensities calculated from the laser light propagation time. Semi-transparent or semi-reflective surfaces can cause several reflection signals to be received in quick succession, which then belong to surfaces at different distances.

Distances are calculated from the received reflection signals. On this basis, together with the intensities of the reflection signals, three-dimensional point coordinates can be calculated, which then form the point cloud. In order to be able to construct a consistent three-dimensional model from the capture processes by means of the moving laser scanner, it is necessary to capture a time stamp for each measurement as well as the exact positional orientation of the laser scanner in space.

The situation is similar with the image information from panoramic cameras, which usually only consist of image files that are time-stamped with the time of capture. Here too, the exact position and orientation of the camera in space must be known or determined for each time stamp and for each image file so that—with the aid of known camera parameters or those to be determined by calibration, such as lens focal length and imaging characteristics, as well as sensor size and resolution—the image data and the point cloud data can be assigned to each other. In this way, an object space can be captured three-dimensionally.

Panoramic images can also be used to provide a very realistic virtual tour through the captured object space. Here, the focus is on the image files, which can be "stitched" together so to speak with the help of 3D information (position and orientation of the camera in space) to form seamless 360-degree panoramas that correspond to the exact view at a specific point in the environment as a viewer would perceive it on location. Here, the entirety of the panoramic images represents a plurality of individual discrete positions at which the underlying images were taken. The viewer can only jump from one discrete position to another discrete position and change from panoramic image to panoramic image, in contrast to the above-mentioned point cloud model, which can be continuously "flown through". The point cloud model, which is available as background information, can be used here to animate the transitions between the individual panoramic images as cross-fades of differently transformed individual details (for example table surfaces) in such a way that the viewer gets the impression of a reasonably fluid movement in 3D space between the two discrete positions. The point cloud model opens up further possibilities, such as fading in the point cloud via the photo panorama view or assigning an exact 3D coordinate to each pixel of the panoramic image (which allows, for example, length measurements of captured objects by clicking on the boundary points in the panoramic image as well as fading of location-related information ("points of interest") in the panoramic images).

For smaller buildings, it is also possible to capture the environment inside the building by simultaneously capturing point cloud data and panoramic images using stationary, tripod-mounted equipment that is moved from position to position. The positions can, for example, be aligned with fixed reference points and marks in the space, which can also be found in pre-existing plans, thus facilitating the allocation.

However, for the fast capture of large buildings, especially the interior of the building, the continuous capture by a mobile system is advantageous.

For this purpose, there exist portable systems in backpack form or hand-held systems in various designs. These portable systems have the disadvantage that, due to weight restrictions, only light-weight camera systems can be used, the lenses of which do not make it possible to capture high-quality images. In addition, the jerky movements when carrying the camera around due to motion blur, in particular rotational movements and in difficult lighting situations, make it difficult to take sharp, blur-free pictures. For this reason, the main purpose of this equipment is usually to capture a (coloured) point cloud, as the image quality of the captured camera images is not critical for this.

In applications where the objective is to capture high-quality, high-resolution panoramic images, especially the capture of HDR ("High Dynamic Range") images under difficult lighting conditions, stationary, tripod-mounted equipment is suitable for smaller buildings as described above.

For larger buildings, however, mobile equipment in "trolley" design, pushed by an operator, is particularly suitable. In this case a mobile frame provides greater stability. In the resting position, therefore, blur-free images can be captured. In addition, larger and heavier, higher-quality camera lenses, laser scanners, electronic components and energy stores can be attached to the moveable equipment and thus moved very comfortably. As explained above, the problem with all of the mobile capture systems mentioned is that the trajectory, and for systems that are intended to allow visual monitoring of the capture process on a screen, the instantaneous position must also be determined efficiently and accurately in real time.

Different methods can be used for this purpose, which can also be combined. On the one hand, inertial measurement units (IMU) can be considered, which combine one or more inertial sensors, such as acceleration sensors and rotation rate sensors. However, one problem here is that measurement errors add up, which can lead to a strong "drift". For this reason, IMUs are often only used in a supporting capacity. The same applies to odometers.

In practice, what are known as SLAM procedures ("Simultaneous Localization and Mapping") are therefore generally used for mobile systems. These are based on the assumption that the captured environment is static and only the capture system itself moves. In the case of a laser scanner, for example, the captured data of a laser mirror rotation pass is compared with the data of one or more previous passes. Assuming that the environment is static and that the capture system has moved linearly parallel to the laser scan plane, the two sets of points of the two measurement passes would be more or less congruent within measurement tolerances, but would be shifted in translation and/or rotation, so that a profile of the environment as a 2D section through 3D space (corresponding to the laser scanner plane) and simultaneously the movement/rotation of the capture system within this 2D section would result immediately and simultaneously (hence the term "Simultaneous Localization and Mapping"). In practice, however, the movement and especially the rotation must not be too fast in relation to the scanning frequency.

The algorithmic assignment of temporally separated measuring points to identical, repeatedly scanned environmental features and from this the determination of the trajectory of the capture system and the creation of an overall model of the environment is also possible, provided there is a sufficient number and redundancy of measuring points, if the laser scanner capture direction changes over time and is arranged arbitrarily to move the capture system, however, depending on the size and distribution of the point cloud and features in space, this may require very long computing times, so that these methods can usually only be used in post-processing at a high level of detail, but not for real-time representation of the movement in space during the capture process. For example, in the above-mentioned stationary, tripod-mounted solutions, it is common practice to upload the captured data of the individual scan positions to a cloud-based computing centre, where they can be merged into a consistent model in post-processing.

Comparable to this are photogrammetric methods, in which a textured 3D model can be created from a large number of images of one and the same object or the same environment taken from different angles, for example by using what is known as the bundle-adjustment method, in which the positions of the points in 3D space, the positions and orientations of the observing cameras and their internal calibration parameters are simultaneously adjusted to the measured images in an optimisation process. These methods provide good results for well-textured surfaces, but fail for surfaces with the same colour and few features as well as for more complicated intersections and reflecting objects.

For so-called virtual reality or augmented reality applications, which can also be executed by mobile phones (smartphones), there exist also solutions that function similarly to the SLAM method or photogrammetric method. Here, image sequences captured by smartphone cameras are analysed in real time in order to track environmental features over time, usually supported by measurement data from the IMUs also installed in smartphones, so that a rough capture of the environment and the movement of the smartphone in space can be derived in real time, which then allows, for example, the precise insertion of virtual objects into the camera viewfinder image.

So-called "Structured Light" solutions are also suitable for smaller spaces and short distances, with (infrared) dot patterns being emitted from the capture system, the distortion of which in the camera image provides information about the 3D structure of the scene captured.

Furthermore, so-called time-of-flight cameras are known which, similarly to a laser scanner operating in parallel, emit a flash of light and determine very precisely for each pixel of the camera sensor the individual point in time at which the reflection signal is captured, so that distance information for the pixel in question is derived from the light travel time. Due to the low resolution and the limited range and precision, however, these systems are not suitable for the detailed capture of large buildings.

The same applies to stereo depth cameras, which, similarly to the human eye, obtain depth information from the parallax information of two camera images. Here, too, the precision and resolution are insufficient for surveying applications.

Laser scanners are therefore particularly suitable for high-precision capture systems with which larger buildings are to be scanned to within a few millimetres (for example trolley-based mobile mapping systems).

With these mobile mapping systems, real-time visualisation of the capture process and the movement in space on an operator screen is particularly simple, robust and fast if—as shown in the example above—a 2D laser scanner scans in a plane that remains constant during the movement, i.e. the capture system also moves in a parallel 2D plane, as is the case in buildings with flat floors in the rooms and corridors. In this case, reference is also made to 2D-SLAM or real-time 2D-SLAM with three degrees of freedom (3 DoF) (i.e. 2 spatial axes X-Y and one axis of rotation—'yaw').

Since the aforementioned laser scanner oriented for the 2D SLAM method is horizontally oriented while moving through the space and always scans the same constant plane and does not capture the space itself over the entire area, additional 2D laser scanners are therefore used for capturing the actual point cloud and are arranged in other planes, so that by moving the capture system these scan planes sweep the space evenly, so that the surroundings are scanned and captured as evenly and completely as possible.

When capturing large buildings, it is desirable to capture as large an area as possible in a continuous scanning process without interruption in order to keep the effort required for the so-called registration, i.e. the combination of partial point cloud models from individual partial scanning processes to form an overall point cloud model by exact orientation and alignment of the overlapping areas of the partial point clouds, as low as possible. Although this registration process is in principle algorithmically possible, it may be computationally intensive depending on the size of the partial models and may still require manual pre- or post-adjustment.

Trolley-based mobile mapping systems, which work with 2D-SLAM methods, have so far generally required the current scan process to be terminated and a new scan process to be started as soon as, for example, a larger step, steeper ramp or even stairs have to be negotiated, even if individual systems are able to process ramps with low gradients, for example by evaluating IMU data, or to compensate for disturbances caused by speed bumps, traversed cables etc. by means of correction algorithms.

Furthermore, capture systems with six degrees of freedom (6 DoF) (i.e. three spatial directions X-Y-Z and three directions of rotation ("roll-pitch-yaw"/6 DoF-SLAM methods) are known.

For example, the publication by George Vosselman, "DESIGN OF AN INDOOR MAPPING SYSTEM USING THREE 2D LASER SCANNERS AND 6 DOF SLAM", ISPRS Annals of the Photogrammetry, Remote Sensing and Spatial Information Sciences, Volume 11-3, 2014. ISPRS Technical Commission III Symposium, 5-7 Sep. 2014, Zurich, Switzerland 10.5194/isprsannals-II-3-173-2014 (https://www.isprs-ann-photogramm-remote-sens-spatial-inf-sci.net/II-3/173/2014/isprsannals-II-3-173-2014.pdf) describes a method for capturing an object space within a building. It uses a plurality of single-plane scanners whose scanning planes are not arranged parallel to each other. The processing of the data captured by this system is, however, algorithmically very complex, and therefore this method is not suitable for real-time visualisation of the scanning process, but only for the calculation of a point cloud model in post-processing. In addition, EP 3 228 985 A1 discloses a capture system in six degrees of freedom with 3D-SLAM methods.

Various laser scanners are known from DE 10 2011 121 115 B4 or DE 10 2004 050 682 A1. Furthermore, a multiple scanner is known from EP 2 388 615 A1 and US 2017/0269215 A1, which emits signal beams in a fan shape and measures the reflections of these signal beams.

When capturing an object space within a building, there is also the problem that not only should the walls and ceilings of the object space be captured very precisely, but also objects and fixtures in the object space. With known mobile capture apparatuses, the problem has arisen that different objects that are at approximately the same height as the capture apparatus are not sufficiently captured during the scanning processes.

SUMMARY OF THE INVENTION

One aspect of the invention relates to a mobile apparatus and a method for capturing an object space, with which the capture of the object space in building environments is improved in such a way that an uninterrupted capture is possible even if the mobile apparatus overcomes differences in height during movement, for example on steep ramps or the like, and also such objects which are at a similar height as the mobile apparatus during the capture process can be precisely captured.

Advantageous embodiments and developments are also disclosed.

The mobile apparatus for capturing an object space according to the invention has a frame. At least one single scanner is mounted on the frame. This single scanner comprises a first emission unit for generating a first signal beam in a first emission direction, a first receiver for detecting a first reflected ray generated by reflection of the first signal beam on at least one object of the object space, and a first scanning device for changing the first emission direction of the first signal beam. Furthermore, the mobile apparatus comprises a multiple scanner mounted on the frame above the single scanner. The multiple scanner comprises a plurality of second emission units integrated in a component for generating a plurality of second signal beams in second emission directions, a second receiver for detecting second reflected rays generated by reflections of the second signal beams at one or more objects of the object space, and a second scanning device for changing the second emission directions of the second signal beams.

The mobile apparatus also has an evaluation device which is coupled for data exchange at least to the second receiver and which is designed to generate and output in real time, at least from the second reflected rays detected by the second receiver, a graphical representation of those regions of the object space through which the mobile apparatus can be moved and/or has been moved.

Finally, the mobile apparatus has a data interface which is coupled for data exchange at least to the first receiver and which is designed to output data generated at least from the first reflected ray detected by the first receiver to a memory device for post-processing.

The mobile apparatus of the present invention allows conflicting requirements to be satisfied simultaneously: On the one hand, the mobile apparatus can capture and output in real time the position of the apparatus in the object space during the capture process even in building environments, in particular inside a building. For this purpose the apparatus comprises the multiple scanner with the associated evaluation device. On the other hand, the object space can be captured very precisely, and a three-dimensional model of the captured object space can only be generated in a post-processing. For this purpose the apparatus comprises at least one high-precision single scanner. The single scanner can thus be designed in such a way that the data generated by the single scanner need not be suitable for real-time processing for calculating and outputting the position of the apparatus in the object space. The multiple scanner is provided specifically for this purpose. The single scanner can thus be optimised to generate data that can be used to model the object space as precisely as possible in a post-processing. Furthermore, the single scanner is arranged on the frame of the mobile apparatus in such a way that it can also capture objects located below the height of the multiple scanner in the object space. Specifically, the single scanner is positioned below the multiple scanner, so that the signal beams generated by the emission unit of the single scanner can strike the underside of objects positioned at the height of the multiple scanner or even below the multiple scanner. With known capture apparatuses it was only possible to capture the underside of such objects insufficiently.

Furthermore, the apparatus according to the invention allows the uninterrupted capture of the object space even if the vertical orientation of the apparatus changes, for example if the apparatus is moved up or down along ramp. In this case, the use of the multiple scanner enables the uninterrupted capture of the object space. In fact, the use of the multiple scanner allows a real-time 3D SLAM method with six degrees of freedom to be used. It is not necessary to divide the capture process into sub-processes and reassemble these sub-processes in the post-processing.

The use of the multiple scanner in the mobile apparatus has the advantage that the apparatus in motion not only always captures new surface portions of the object space by the second signal beams sweeping over these surface portions, but that the signal beams always strike surface portions already captured previously, i.e. those surface portions that have already been captured by previously emitted other second signal beams. This makes it possible to compare the second reflected rays detected by the second receivers with previously detected second reflected rays. The movement of the mobile apparatus can then be calculated from this comparison, so that it is possible to determine the position of the mobile apparatus in the object space. This in turn makes it possible to generate and output a graphical representation of those areas of the object space through which the mobile apparatus has been moved. From this, in turn, it is possible to determine through which areas of the object space the mobile apparatus can be moved on the basis of a preliminary modelling of the object space using the data that can be obtained at least from the second reflected rays. These possible movements of the mobile apparatus in the object space can also be graphically displayed and output by means of the evaluation device.

According to an embodiment of the apparatus according to the invention, the frame defines contact points on which the frame can stand freely on a horizontal plane. In particular, three contact points are defined, so that the frame always stands shake-free on a horizontal plane. In this case, the single scanner is mounted on the frame at a vertical distance from the plane defined by the support points, which is less than 60 cm. The distance is in particular less than 55 cm. The single scanner is therefore mounted very low down on the frame. This arrangement has the advantage that a first signal beam emitted obliquely upwards can hit the underside of an object that is at a horizontal distance from the mobile apparatus. In this way it is possible to capture in particular the undersides of tables, chairs or the like.

According to a further embodiment of the apparatus according to the invention, the precision of the capture of objects in the object space by the multiple scanner is lower than the precision of the capture of the objects in the object space by the single scanner. The use of the less precise multiple scanner is not disadvantageous for the real-time processing, since a so-called sub-sampling to a so-called coarser voxel grid is carried out to reduce the computing effort. Therefore, real-time processing does not require such a high degree of precision as is required for post-processing. On the other hand, the higher precision of the single scanner allows a more precise modelling of the object space in post-processing. Although the data generated by the multiple scanner can also be used in the post-processing, the single scanner can be optimised to capture the objects of the object space as precisely as possible without limiting the design of the single scanner with regard to real-time processing of the data. Similarly, it is possible also to use data generated by the single scanner in real-time processing to generate the graphical representation of the object space. However, an optimisation of the design for this processing of the data is only possible for the multiple scanner.

According to a further embodiment of the apparatus according to the invention, the second emission directions are fan-shaped so that an emission fan with a central axis is formed. In particular, the multiple scanner is mounted on the frame so that the plane formed by the emission fan is vertically oriented. The angle of aperture of the emission fan can be in the range of 25° to 35°. The preferred angle of aperture is 30°.

In particular, the second emission units of the multiple scanner are one or more lasers. The second signal beams can be emitted by a plurality of lasers simultaneously in a fan-shaped manner in the second emission directions. However, laser pulses (signal pulses) in the second emission directions are preferably emitted one after the other, so that the fan-shaped emission of the second signal beams in the second emission directions only occurs when the scanner is observed for a certain time interval. The laser pulses in the second emission directions can be emitted by a laser whose emission direction is changed. Preferably, however, several lasers are used, which emit pulses in different emission directions one after the other. The distances between the pulses can be selected so that the reflection of the laser pulse is captured before the next laser pulse is emitted. Therefore, the time interval between the laser pulses depends on the range that is to be achieved by the signal beams for capturing the object space.

According to a further embodiment of the apparatus according to the invention, the second scanning device is designed to rotate the second emission directions of the second signal beams around a second axis of rotation. The multiple scanner thus scans the volume of the rotational body of a fan. According to a preferred embodiment, the multiple scanner is mounted on the frame in such a way that the second axis of rotation is inclined at a first angle to the vertical. In particular, the first angle is in a range of 5° to 12°, advantageously in a range of 6° to 9°, and preferably this angle is 7°. This ensures that, in the direction in which the axis of rotation is tilted, closer surface portions of the ground surface on which the mobile apparatus is moving can be captured. In the opposite direction, however, the fan-shaped emission is tilted upwards so that fewer areas below the multiple scanner are irradiated. In this direction there is advantageously less coverage by a person moving the mobile apparatus.

The second axis of rotation is thus tilted forward, particularly with regard to one direction of movement of the mobile apparatus. Tilting the second axis of rotation is also advantageous for the real-time 3D SLAM method. In this case, not only are sections through the object space that run exactly horizontally to the direction of movement delivered for real-time visualisation, but also sections that run transverse to the direction of movement.

On the one hand, this means that the information necessary for the SLAM method is still captured, i.e. recurring features of the environment that can be identified in successive rotation passes of the laser scanner. For example, a feature of the environment that was captured in a rotation pass in a first scanning plane of the multi-plane scanner could reappear in the following rotation pass in the capture data set of the next or next-but-one plane of the scanner.

On the other hand, it can also be used to quickly capture large areas of space for the purpose of 3D visualisation for the operator, including in particular nearby features of the floor in front of the capture apparatus and more distant features of the ceiling behind the capture apparatus. Since precision is not the main focus for 3D visualisation, the flat angle of impingement on the floor or ceiling and the associated error dispersion—with the limited precision of the multi-plane scanner anyway—are not a disadvantage. However, it allows the visualisation of the captured environment in 3D, more specifically in a representation that provides more details than a multi-slice-line-section display, which is preferably used in the field of autonomous driving, where the aim is to quickly capture large areas of space in real time, especially with a long range forward in the direction of travel.

According to a further embodiment of the apparatus according to the invention, the first scanning direction is designed to rotate the first emission direction of the first signal beam about a first axis of rotation which is perpendicular to the first emission direction, so that a first plane is scanned. The first emission unit of the single scanner is, in particular, also a laser. In this case too, the signal beam may include laser pulses, the reflection of which is captured by the first receiver. A plane is thus scanned by the rotation of the signal beam. In this case the single scanner is a single-plane scanner.

The first plane encloses, in particular, a second angle with the vertical, which angle is in the range of 10° to 20°. The second angle, in particular, is in the range of 13° to 17°. It is preferably 15°. With this orientation of the first plane, horizontally oriented surfaces can be optimally captured. At the same time, however, vertically oriented surfaces are also scanned at least with a flat angle of incidence, so that a transition from a horizontally oriented surface to a vertically oriented surface, i.e. an edge, can be captured.

According to a further embodiment of the apparatus according to the invention, this has at least one second single scanner. This second single scanner comprises a third emission unit for generating a third signal beam in a third emission direction, a third receiver for detecting a third reflected ray generated by reflection of the third signal beam at an object of the object space, and in particular a third scanning device for changing the third emission direction of the third signal beam. The third scanning device is designed in particular to rotate the third emission direction of the third signal beam about a third axis of rotation which is perpendicular to the third emission direction, so that a second plane is scanned. The second plane encloses with the vertical in particular a third angle, which lies in a range of 10° to 20°, in particular in a range of 16° to 19°. The third angle is preferably 18°.

According to a further embodiment of the mobile apparatus, this has at least one third single scanner. This third single scanner comprises a fourth emission unit for generating a fourth signal beam in a fourth emission direction, a fourth receiver for detecting a fourth reflected ray generated by reflection of the fourth signal beam at an object of the object space, and in particular a fourth scanning device for changing the fourth emission direction of the fourth signal beam. The fourth scanning device is in particular designed to rotate the fourth emission direction of the fourth signal beam about a fourth axis of rotation which is perpendicular to the fourth emission direction, so that a third plane is scanned. The third plane encloses with the vertical in particular a third angle, which lies in a range of 10° to 20°, in particular in a range of 16° to 19°. The third angle is preferably 18°.

The first, second and third planes of the first, second and third single scanners are thus substantially vertical, enclosing an acute angle with the vertical. In addition to the advantages already mentioned above, this orientation of the planes has the further advantage that there is little shadowing from frequently occurring vertical surfaces. For example, because of its vertical extent, an object standing on a table will cast only a very short shadow in the horizontal direction when signal beams hit it. In addition, there is less scattering of the measured values on horizontally oriented surfaces.

According to a further embodiment of the mobile apparatus, the second and third single scanners are symmetrically arranged and oriented with respect to a centre plane of the mobile apparatus.

With some single scanners, the plane is scanned in an angular range smaller than 360°. In this case, a blind angle results, in which the plane is not scanned. If the mobile apparatus of the present invention uses such single scanners with a blind angle as second and third single scanners, i.e. if the second and third planes are scanned in an angular range smaller than 360°, resulting in a second blind angle in the second plane and a third blind angle in the third plane, the blind angles of these planes are preferably oriented as follows: when viewed against a normal of the second plane, a first leg of the second blind angle includes a third angle with the vertical which is in a range of 5° to 10° and which is outside the second blind angle The blind angle can be 90°, for example. Due to the symmetrical arrangement of the third single scanner to the second single scanner, the blind angle of the third single scanner is then symmetrically oriented accordingly. This means that the two legs of the blind angles of the second and third single scanner intersect at the centre plane above the mobile apparatus. The above-defined selection of the third angle in a range of 5° to 10° has the advantage that a preferred capturing of the object space above the mobile apparatus is ensured. In this way, the mobile apparatus can use low-cost single scanners, each with a blind angle, but the capture of the object space, especially above the mobile apparatus, is not affected. In combination with the first single scanner, the object space can be completely captured in this way.

According to an embodiment of the mobile apparatus, this comprises at least one second single scanner comprising a third emission unit for generating a third signal beam in a third emission direction, a third receiver for detecting a third reflected ray generated by reflection of the third signal beam at an object in the object space, and at least one third single scanner, comprising a fourth emission unit for generating a fourth signal beam in a fourth emission direction, and a fourth receiver for detecting a fourth reflected ray generated by reflection of the fourth signal beam at an object in the object space, the second single scanner and the third single scanner being arranged and oriented symmetrically with respect to a centre plane of the mobile apparatus.

For the best possible capture of the precision point cloud, which must be available only after post-processing and is not time-critical, several, preferably three, precise single-plane scanners are used in particular as single scanners in accordance with the invention.

The mobile apparatus according to the invention provides a trolley-based mobile mapping system. In the practical use of this system, it is important to map the spatial structure of the objects that are usually located in the scanned buildings in the best possible way by means of point cloud capture. Here, the orientation of the single scanners used for point cloud capture (usually single-plane laser scanners) plays a decisive role.

Of particular importance for BIM (Building Information Modeling) applications is, for example, to capture the ceiling structure and objects installed there (for example ventilation ducts, trunking, smoke detectors, etc.) in the point cloud data with a high level of detail. The same applies to the exact capture of wall structures such as door and window reveals. In office and workshop environments it is also important to capture tables and workbenches well.

For a good imaging of edges and partial surfaces, it is advantageous if the laser scanner beams are incident at a not too flat angle, so that the scattering range of the measured values or measurement errors is not increased by stretching. For this reason, the point cloud capture laser scanners of known mapping systems are usually oriented at angles oblique to the direction of movement, for example 45°, because if they were to scan at right angles or almost at right angles to the direction of movement, their laser beams would hit door and window reveals at very flat angles, as these are usually at right angles to the walking and movement direction of the capture system in building corridors. With laser scanners arranged accordingly obliquely to the direction of movement of the capture system, in order to optimise the capture also of structures and edges in the building which are likewise oblique to the direction of movement, but are usually arranged vertically, it is recommended that the laser scanners are also obliquely at an angle to the front or back relative to the direction of movement. Such an arrangement is particularly good for vertical surfaces that are orthogonal to the capture direction. An oblique arrangement of the single scanners additionally reduces any possible obscuration by an operator or other devices of the apparatus.

According to a further embodiment of the mobile apparatus, the frame comprises a base element and a frame head. In this case, the height of the frame head can be changed by an adjustment mechanism. The adjustment mechanism may in particular comprise a sensor designed to capture the vertical distance of the frame head from the base element. A number of wheels can be mounted on the base element of the frame, by means of which wheels the mobile apparatus can be rolled over a ground surface so that the frame is mobile. In particular, the frame and/or the wheels can define a direction of forward movement for capturing the object space.

In practical use, it is also often necessary to manoeuvre a trolley-based mobile mapping system through narrow points (for example, doors or gates) that prevent unhindered passage in terms of height or width. With the known trolley systems, it is therefore often necessary to tilt the system around the pitch or roll axis in order to pass through the narrow point. At particularly narrow points it may also be necessary to dismantle parts of the trolley system. In these cases, it has so far usually been necessary to terminate the current scan process, among other things because the SLAM process is interrupted by the loss of reference points in the constantly scanned line plane. After passing through the narrow point it is then necessary to start a new scan process. In the post-processing, the partial point clouds must then be combined into a total point cloud with corresponding effort and oriented exactly for this purpose.

In the apparatus according to the invention, temporary tilting about one of the described axes is harmless due to the 3D-6 DoF-SLAM method described above. However, during the tilting there is still a risk of problems arising during post-processing. For practical use, it is therefore desirable to be able to pass through such narrow points without having to tilt the trolley and without having to interrupt and restart the scanning process. Thanks to the adjustment mechanism, the height of the frame can be adjusted dynamically, i.e. during the scanning process. For example, a column guide or rail guide between the base element and the frame head can be used to adjust the height. However, the problem here is that the single scanners mounted on the frame head change their relative position to the lower single scanner mounted on the base element. The two upper single scanners must therefore be dynamically calibrated relative to the lower single scanner. According to the invention, this calibration can be done by the sensor of the adjustment mechanism capturing the vertical distance of the frame head from the base element, which results in the distance of the upper single scanners to the lower single scanner. The data from this sensor are captured and transmitted to the interface for joint storage with the data from the single scanners and, if applicable, the multiple scanner. The measurement data supplied by the sensor can then be taken into account when calculating the precision point cloud from the data obtained from the single scanners and, if necessary, the data from the multiple scanner.

According to an embodiment of the mobile apparatus, the second axis of rotation of the multiple scanner is tilted forward in the direction of forward movement. In addition, the first plane may also be oriented tilted forward in the direction of forward movement, so that the first emission direction of the first signal beam of the first single scanner is directed obliquely upwards in the direction of forward movement, at least temporarily. The second and/or third plane, on the other hand, can be oriented backwards with respect to the direction of forward movement, so that the third and/or fourth emission direction of the third and/or fourth signal beam of the second and/or third single scanner is/are oriented obliquely downwards in the direction of forward movement at least temporarily. In addition, the second and also the third plane may be oriented swivelled to the side in the direction of forward movement with respect to a vertical plane.

The orientations of the single scanners are also important for the capture of horizontal surface structures. For example, the signal beams, i.e. especially the laser beams of the single scanners, should strike the top and bottom sides of tables and workbenches at a favourable, i.e. not too flat, angle of incidence. Therefore, according to the invention, a known trolley-based mobile mapping system with a second and third single-plane laser scanner for capturing the point cloud data, which are tilted in both the pitch angle and the yaw angle with respect to the direction of movement of the mapping system, is improved by mounting these single-plane laser scanners as high up as possible on the system, and additionally a first single-plane laser scanner, i.e. for point cloud capture, which is mounted as low down as possible on the system and radiates obliquely forward upwardly.

The upwardly inclined scanning plane of this lower single-plane laser scanner also enables good capture of those sides of structures hanging vertically from the ceiling that are parallel or at a very flat angle to the scanning planes of the aforementioned upper single-plane laser scanners.

The largest possible height distance between the two upper single scanners on the one hand and the lower single scanner on the other hand enables the capture of structures arranged at medium height, such as tables and workbenches etc., at a favourable, i.e. steep, angle, both from the top and the bottom. This height spacing of the single scanners has the additional advantage that there is little shadowing by vertically extending objects, for example those standing on or hanging from tables or workbenches. These objects therefore cast only short shadows when signal beams hit them.

According to a further embodiment of the apparatus according to the invention, the frame head comprises a cross beam. This cross beam has a fixed geometrical arrangement in a horizontal plane relative to the base element. In this way, the multiple scanner and/or the second and third single scanners are mechanically attached to the frame head in a fixed geometrical arrangement. This ensures that the arrangement of the scanners attached to the frame head is calibration-proof. After a height adjustment of the frame head, no new calibration is required with regard to the arrangement of the multiple scanner and the second and third single scanner. In practical use of a trolley-based mobile mapping system it is also important to design the components of the system on the one hand in such a modular way that they can be dismantled into the smallest possible subsystems with compact packing dimensions, but on the other hand to design the connections of these subsystems so precisely that a new calibration is not necessary after each assembly. The problem of recalibration after each reassembly is described, for example, in EP 2 199 828 B1, which proposes an algorithmic method to compensate for such misalignment. Independently of such correction possibilities, however, it is desirable to achieve the most precise mechanical connection possible between the dismountable sub-modules of a trolley-based mobile mapping system, although the number and complexity of the necessary assembly steps should be kept to a minimum and no special tools or small parts that can be lost, such as screws, nuts or washers etc., should be used. A further requirement here is that electrical plug connections, for example for power supply and wired data transmission, can be locked in place as easily and securely as possible.

By means of the cross beam and, if necessary, other elements rigidly connected to the cross beam, all devices mounted on the frame head are in a fixed geometric arrangement to each other. A particularly advantageous embodiment is achieved when plastic guides in the cross beam of a carrier plate together with support pins in the head initially allow the head to be easily placed on the carrier plate and the arrangement and shape of the plastic guides after placement allow sufficiently accurate pre-positioning for mechanical and electrical coupling. The pre-positioning advantageously includes a sufficiently precise alignment for a mechanical coupling between additionally provided positioning pins in the head and corresponding positioning sockets in the cross beam in a subsequent coupling process. At the same time, boards for electrical coupling are pre-positioned sufficiently to ensure a secure connection between spring contact probes on the board in the head and the contact surfaces on the board in the cross beam. The actuation of a handle lever, which is furthermore provided, can then simultaneously ensure a secure mechanical and electrical coupling between the head and the cross beam. In the coupled state, the positioning pins of the head and the positioning sockets in the cross beam are fixedly aligned with each other in the degrees of freedom in the direction of height and transverse direction with repeat accuracy. The clamping lever geometry achieved by actuating a handle lever ensures a fixed position of the positioning pins in the axial direction (forward movement direction) and a preload of the spring contact pins for the electrical connection. Due to this high positional accuracy the calibration is maintained.

The aforementioned embodiment of a secure mechanical and electrical connection between the removeable frame head and the base element would also be particularly suitable for modified designs of mobile mapping systems where the base element, which may include, among other things, a CPU motherboard, storage media and (rechargeable) batteries, is designed, for example, in the form of a backpack carrying frame, so that in combination with the above-mentioned 3D-6 DoF-SLAM method, despite the relatively high weight of the frame head, it would still be possible to capture impassable buildings or other environments such as caves, which so far can only be scanned with the portable systems described above, which generally use simple panoramic cameras with lower image quality, which primarily serve only to generate "Colored Point Clouds". The modular nature of the apparatus according to the invention allows the head to be detached from the base element. This makes it possible to mount the frame head not only on backpacks but also on other base elements, for example autonomous vehicles, and to use it with them. The calibration relative to one another of the scanners and/or cameras and/or other sensors arranged on the frame head is maintained.

According to an embodiment of the apparatus according to the invention, at least one wheel is mounted on the frame by means of a quick-release device by which the wheel can be locked. At least two of the wheels are mounted, in particular by means of quick-release devices, and are spaced apart from one another in the direction transverse to the direction of forward movement. It is advantageous that the distance between these two wheels in the transverse direction can be changed. For example, the two wheels on the base element can be mounted in an outer position and an inner position transverse to the direction of forward movement. The distance between the two wheels in the transverse direction is greater when the two wheels are both mounted in the outer position. By contrast, this distance is smaller when both wheels are mounted in the inner position. By changing the distance between the wheels in the transverse direction, it is possible to pass through narrow spaces without affecting the scanning process.

The quick-release devices allow the wheels to be remounted from an outer to an inner position and vice versa very quickly and without interrupting a running scanning process.

Furthermore, a stand apparatus can be mounted on the frame, by means of which stand apparatus the frame can be raised so that at least one wheel no longer touches the ground surface, and can be lowered so that the frame can be moved freely on the wheels. It is advantageous that the stand apparatus is coupled to at least the quick-release device of a wheel in such a way that when the stand apparatus is actuated to lower the frame, the quick-release device is automatically closed and the corresponding wheel is thus locked. For example, when the stand apparatus is actuated to lower the frame, the quick-release device can be forced to close so that the remounted wheel is locked. The use of a plug-in and clamp axle is particularly advantageous here, as is known from wheelchairs, for example.

According to a further embodiment of the apparatus according to the invention, the evaluation device is designed to calculate in real time, at least from data generated by detected reflected rays which have been captured by the second receivers, the position of the apparatus within the object space and/or the trajectory of the mobile apparatus and to output it by means of a graphical representation. A graphical representation of the area of the object space scanned by the mobile apparatus can be generated and output. In this way, an operator can see from the graphical representation which areas of the object space still need to be captured.

According to a further embodiment of the apparatus according to the invention, this has at least one camera mounted on the frame, which is designed to take camera images of at least part of the object space. It is advantageous if a plurality of cameras are mounted on the frame head. The evaluation device can take into account the images captured by the camera or cameras when generating the various graphical representations in real time. In this way, a very realistic representation of the passable area of the object space or the area of the object space already scanned by the mobile apparatus can be generated in real time.

Advantageously, the apparatus according to the invention also has a display device coupled to the evaluation device for displaying the graphical representations generated by the evaluation device. In this way, the drivable area of the object space, the already scanned area of the object space or the not yet scanned area of the object space can be generated in an overall representation of the object space on the basis of the already captured data.

Furthermore, the mobile apparatus advantageously comprises a timer which is coupled with the evaluation device. In this way, the evaluation device can capture the time of detection for each detected measured value of the second receiver together with the second direction of emission of the associated signal beam and the detected amplitude or intensity. A corresponding timer can also be provided for the single scanners in order to provide the detected reflected rays of these single scanners with a corresponding time stamp.

According to an embodiment of the apparatus according to the invention, this comprises a control apparatus for an autonomous movement of the mobile apparatus. For example, the base element may be an autonomous vehicle on which the frame head with the multiple scanner is mounted. The single scanner or a plurality of single scanners are then integrated in particular into the autonomous vehicle. Autonomous movement is understood to mean that the driving task is performed partially or completely autonomously by the apparatus. In particular, the movements of the mobile apparatus in a transverse and longitudinal direction and the speed are controlled autonomously.

The invention further relates to a method for capturing an object space by means of a mobile apparatus. The mobile apparatus has a frame for moving the apparatus in the object space. In the method, at least one single scanner mounted on the frame emits a first signal beam in a first emission direction, a first receiver detects a first reflected ray generated by reflection of the first signal beam on at least one object of the object space, and the first emission direction of the first signal beam is varied by means of a first scanning device for capturing the object space. Furthermore, a multiple scanner mounted on the frame above the single scanner emits a plurality of second signal beams in second emission directions. A second receiver detects second reflection rays, which are generated by reflection of the second signal beams on one or more objects in the object space. Furthermore, the second emission directions of the second signal beams are changed by means of a second scanning device for capturing the object space. Furthermore, at least from the second reflected rays detected by the second receiver, a graphical representation of those areas of the object space through which the mobile apparatus can be moved and/or has been moved is generated and output in real time. Data generated at least from the first reflected ray detected by the first receiver are output to a storage device for post-processing.

The method according to the invention is especially designed to capture an object space by means of the mobile apparatus according to the invention. The method thus has the same advantages as the mobile apparatus of the invention.

In particular, to scan the object space, the first emission direction of the first signal beam is rotated about a first axis of rotation which is perpendicular to the first emission direction, so that one plane is scanned in succession. In addition, the second emission directions of the second signal beams are also rotated about an axis. The second signal beams are emitted in particular in a fan shape. The emission of the second emission directions does not have to take place simultaneously; rather, it can also be emitted successively, so that within a time interval signal beams, which can include signal pulses, are emitted in a fan shape in a plane. This emission fan can then be rotated about a second axis of rotation.

According to an embodiment of the method according to the invention, at least one second single scanner emits a third signal beam in a third emission direction, a third receiver detects a third reflected ray which is generated by reflection of the third signal beam on an object of the object space, and the third emission direction of the third signal beam is changed by means of a third scanning device for capturing the object space.

The third emission direction of the third signal beam can be rotated about a third axis of rotation perpendicular to the third emission direction so that a second plane is scanned.

According to an embodiment of the method according to the invention, at least a third single scanner emits a fourth signal beam in a fourth emission direction, a fourth receiver detects a fourth reflected ray which is generated by reflection of the fourth signal beam on an object of the object space, and the fourth emission direction of the fourth signal beam is changed to capture the object space.

The fourth emission direction of the fourth signal beam can be rotated about a fourth axis of rotation perpendicular to the fourth emission direction so that a third plane is scanned.

According to an embodiment of the method according to the invention, the second single scanner and the third single scanner are symmetrically arranged and oriented with respect to a centre plane of the mobile apparatus.

When the object space is captured, the mobile apparatus is moved within the object space. Meanwhile, the object space is scanned by means of the single scanner or the plurality of single scanners and the multiple scanner.

BRIEF DESCRIPTION OF THE DRAWINGS

The invention will now be explained on the basis of an embodiment with reference to the drawings.

DETAILED DESCRIPTION

Figure 1:
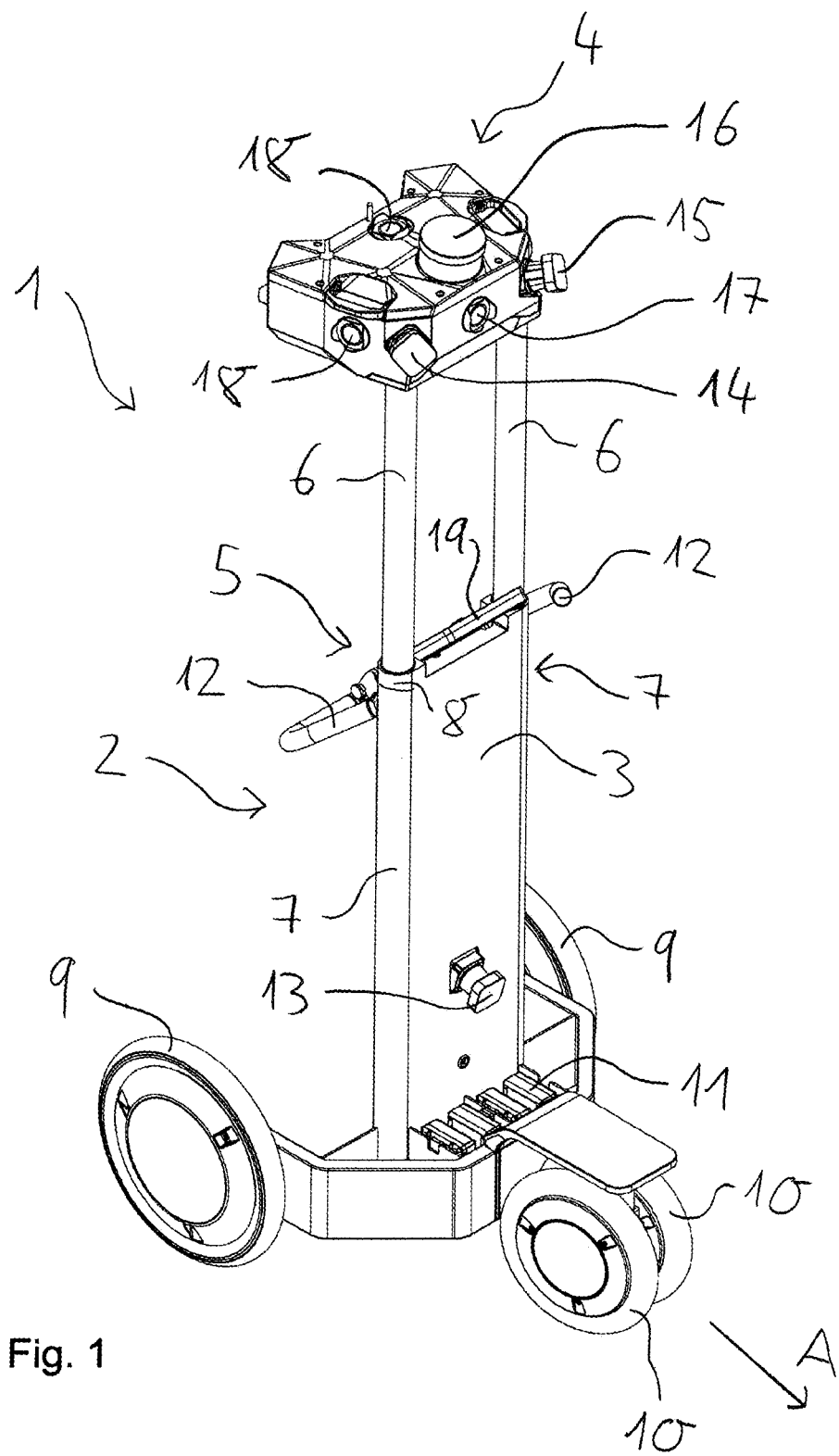
FIG. 1 shows a perspective view of the mobile apparatus according to an embodiment of the invention.

First of all, the basic structure of mobile apparatus 1 will be explained with reference to FIGS. 1 and 2:

The mobile apparatus 1 comprises a frame 2. The frame comprises a lower base element 3 and a frame head 4. An adjustment mechanism 5 is integrated in the base element 3, with which adjustment columns 6 can be moved up and down in a column guide 7. A sensor 8 captures the vertical adjustment path of the adjustment columns 6 in the column guide 7. The adjustment columns 6 are connected at their upper ends to a mounting plate 37, which can be used to attach the frame head 4 to the base element 3. The mounting plate 37 enables not only a mechanical but also a data-exchange connection between the frame head 4 and the base element 3.

At the bottom of the base element 3, two outer wheels 9 are detachably mounted, as well as two middle wheels 10. The outer and middle wheels 9, 10 define contact points where the frame 2 can stand freely on a horizontal plane. In this way, a vertical direction is defined. It is the direction perpendicular to the plane defined by the contact points of the wheels 9 and 10 of the mobile apparatus 1. The indications "bottom" and "top" in this publication refer to this vertical direction.

In addition, the wheels 9 and 10 define a forward movement direction A, in which the mobile apparatus 1 is rolled in a plane. With respect to a vertical plane oriented in the forward movement direction A, the outer wheels 9 are arranged symmetrically. This vertical plane defines a centre plane of the mobile apparatus 1 in direction of forward movement A.

Energy stores 11 are disposed in the lower part of the base element 3. Furthermore, other devices of the mobile apparatus 1 may be disposed within the base element 3 if they do not need to be height-adjusted. If these other devices are located in the lower part of the base element 3, this gives the mobile apparatus 1 increased stability, as the centre of gravity is shifted downwards.

The mobile apparatus 1 can be rolled over a ground surface by an operator using handles 12. Due to the arrangement of the wheels 9 and 10, a forward movement direction A is defined. However, the mobile apparatus 1 can also be rotated about a vertical axis to travel through curves on a ground surface.

According to another embodiment, the mobile apparatus 1 includes a control apparatus for autonomous movement. The mobile apparatus is then an autonomous vehicle.

A first single scanner 13, namely a single-plane laser scanner, is arranged in the lower region of the base element 3. The function and orientation of this first single scanner will be explained in detail later.

A second and a third single scanner 14, 15 are arranged on the frame head 4 and can each also be designed as a single-plane laser scanner. The second and third single scanners 14, 15 are arranged symmetrically to each other with regard to the vertical centre plane of the mobile apparatus 1.

The single scanners 13, 14 and 15 are laser scanners for optical distance measurement (LIDAR, Light Detection and Ranging). A single-plane laser scanner by the company Hokuyo is used.

Furthermore, a multiple scanner 16 is arranged on the frame head 4. As multiple scanner 16, a multi-plane laser scanner by the company Velodyne, type VLP-16, is used. The function and orientation of the multiple scanner 16 will be explained in detail later.

A first camera 17 is accommodated in the centre of the frame head 4 and is oriented in the forward movement direction A. Further cameras 18 are arranged on the top and on the sides of the frame head 4.

In the region of the handles 12, a screen 19 is also attached to the base element 3 in such a way that an operator who pushes the mobile apparatus 1 in the forward movement direction A can see the display on the screen 19.

Figure 3:
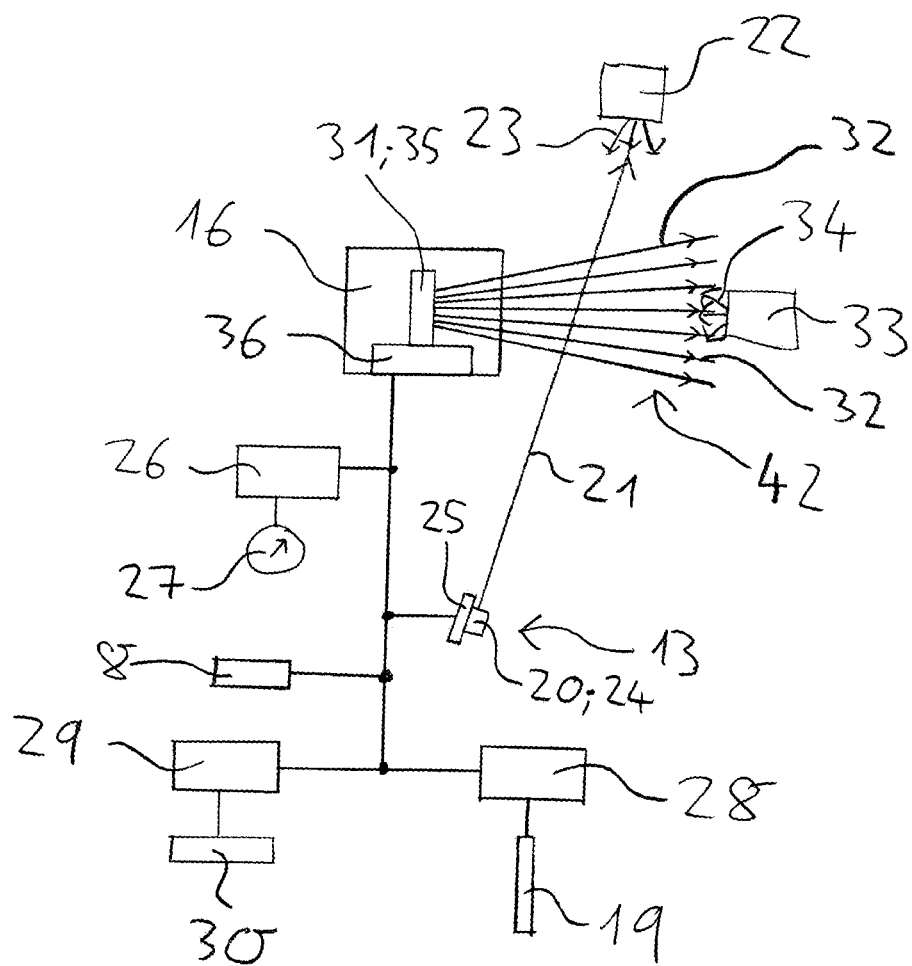
FIG. 3 shows the data-exchange structure of the embodiment of the mobile apparatus.

With reference to FIG. 3, the data-exchange structure of the mobile apparatus 1 will be explained, as well as details of the emission of the single scanner 13 and the multiple scanner 16:

The first single scanner 13, which is mounted at the bottom of the base element 3, comprises a first emission unit 20. This is a laser that emits laser pulses in a first emission direction as a first signal beam 21. The first signal beam 21 can, for example, strike an object 22 of the object space to be captured. The pulses of the first signal beam 21 are reflected on the object 22, resulting in a first reflected ray 23. A first receiver 24 is integrated in the first emission unit 20, which captures the back-scattered or reflected part of the first reflected ray 23. From the transit time of a signal pulse, the distance of the surface of the object 22 where the signal pulse was scattered or reflected can be determined. In addition, the received intensity of the detected reflected ray can be measured and set in relation to the emitted intensity.

The first single scanner 13 also has a first scanning device 25. The first scanning device 25 can be used to change the first emission direction of the first signal beam 21. The first scanning device 25 can rotate the laser of the first emission unit together with the first receiver 24 about a first axis of rotation which is perpendicular to the first emission direction. Alternatively, the laser and/or receiver 24 cannot be rotated by themselves, but instead only the signal beams 21 or the reflected ray 23 are deflected by means of rotatable mirrors. In this way, the first signal beam 21 sweeps over a first plane perpendicular to the first axis of rotation within a time interval.

The multiple scanner 16 comprises a plurality of emission units 31. These emission units 31 are made up of a number of lasers integrated in one component and thus have a fixed orientation to each other. The lasers of the second emission units 31 generate a multitude of second signal beams 32 in second emission directions. The second signal beams 32 are oriented so that they span an emission fan 42 which defines a plane. Details regarding the geometry and orientation of this emission fan 42 will be explained later. The second signal beams 32 can strike an object 33, for example. As with the object 22, the second signal beams 32 are scattered or reflected on a surface of the object 33. In this way, second reflected rays 34 are generated. The back-scattered or back-reflected part of these second reflected rays 34 is detected by a second receiver 35, which is integrated in the second emission units 31.

In the present exemplary embodiment, the second emission units 31 comprise 16 lasers, which emit signal pulses in succession. For example, the individual lasers of the second emission units 31 emit successive signal pulses. The time interval between these signal pulses results from the propagation time of a signal pulse to an object 33, which is located at the maximum range of the multiple scanner 16, is reflected there and returns to the second receiver 35. When the second receiver 35 has detected this signal pulse, the signal pulse of the next laser is emitted. For example, there can be a time interval of 2.3 μs between the signal pulses. During this time, the light can travel 690 m, so that even with a maximum range of 100 m, there is a sufficient time interval between successive signal pulses. A signal pulse is 6 ns long, for example.

Furthermore, the multiple scanner 16 comprises a second scanning device 36. This second scanning device changes the second emission directions of the second signal beams 32. The second emission directions of the second signal beams 32 are rotated about a second axis of rotation. This second axis of rotation lies in the plane formed by the emission fan 42 of the second signal beams 32. Furthermore, the second axis of rotation is perpendicular to a central axis of the emission fan 42 of the second signal beams 32. This central axis may, in particular, be an axis of symmetry of the emission fan 42 of the second signal beams 32. In this way, the multiple scanner 16 captures the rotation body of a fan.

The first scanning device 25 and the second scanning device 36 are coupled to a control unit 26. The control unit 26 is in turn connected to a timer 27. The control unit 26 controls the emission of the first emission unit 20 and the second emission units 31. Furthermore, the control unit 26 controls the first scanning device 25 and the second scanning device 36. The time and orientation of the signal beams 21 and 32 are thus controlled by the control unit 26. Furthermore, the control unit 26 transmits data to an evaluation device 28. In particular, the time, orientation and intensity of each emitted signal pulse are transmitted to the evaluation device 28. In addition, the evaluation device 28 captures through a coupling with the sensor 8 how the height, i.e. the vertical position of the frame head 4 relative to the base element 3, was at the corresponding time stamps. Furthermore, the first single scanner 13 and the multiple scanner 16 are connected to the evaluation device 28. The reflected rays detected by the first 24 and second receiver 35 are transmitted as signals to the evaluation device 28. This relates these signals to the data transmitted by the control unit 26 to the emitted signal pulses. In this way, the evaluation device 28 can calculate the direction and distance of an object 22, 33 in the object space. In addition, other features of the surfaces of objects 22 and 33 can be calculated if necessary.

A three-dimensional point cloud is generated in real time by the evaluation device 28, which reproduces the captured object space. For this purpose, at least the reflected rays 34 detected by the second receiver 35 are used in the real-time calculation. If this is possible in the real-time calculation, the reflection beams 23 detected by the first receiver 24 can also be taken into account. Furthermore, the cameras 17 and 18 can also be coupled to the evaluation device 28 and the control unit 26. The control unit 26 can control the triggering of the cameras 17 and 18. The data regarding the images captured by the cameras 17 and 18 are transmitted to the evaluation device 28 which can also use these data for real-time processing and for generating the three-dimensional point cloud, if necessary. In this way, the evaluation device 28 calculates in real time a graphical representation of those areas of the object space through which the mobile apparatus 1 can be moved and/or has been moved. This graphical representation is output from the screen 19. It is continuously updated as the object space is captured.

The first receiver 24 is coupled to a data interface 29 via the evaluation device 28. All other devices of the mobile apparatus 1, through which data can be captured, are also coupled to this data interface. These include the second receiver 35, the control unit 26 and the sensor 8. The data transmitted to the data interface 29 are stored on a memory device 30. Alternatively, the data can also be transmitted to an external data memory via a wireless connection. The data stored by the memory device 30 or the external data memory are then used for post-processing.

This post-processing generates a more precise point cloud of the object space captured. The computing effort required for post-processing is so great that it cannot be performed in real time by the evaluation device 28.

Figure 2:
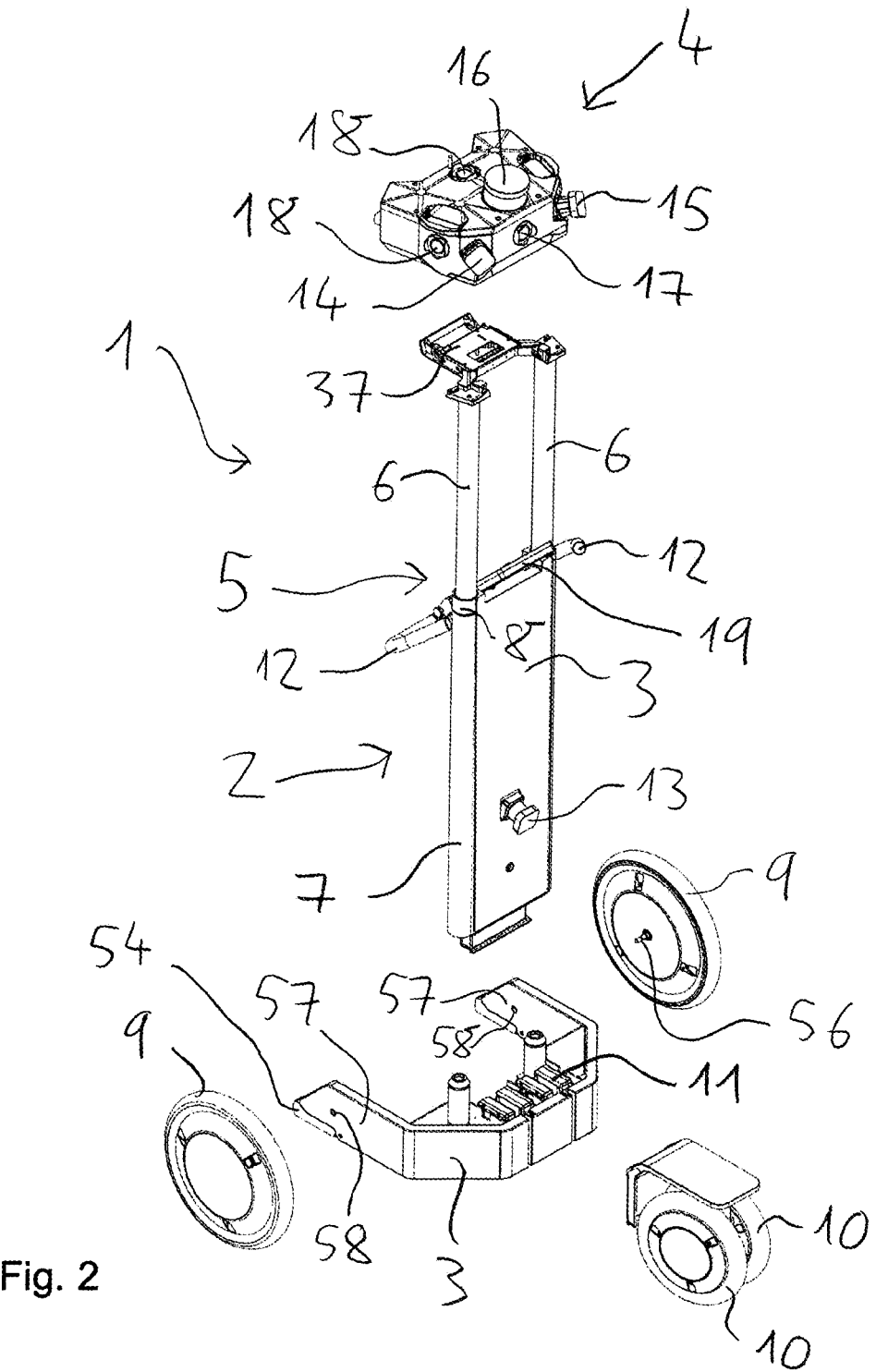
FIG. 2 shows an exploded view of the embodiment of the mobile apparatus.

In the embodiment of mobile apparatus 1 shown in FIGS. 1 and 2, this device 1 additionally comprises the second 14 and third single scanner 15, which are mounted above the first single scanner 13 on the frame head 4. The second 14 and the third single scanner 15 can be of the same type as the first single scanner 13. They differ from the first single scanner 13 only in their arrangement in the mobile apparatus 1 and their orientation. The single scanners 14 and 15 can be controlled in the same way by the control unit 26. The reflected rays detected by them can be transmitted in the same way to the evaluation device 28, and further to the data interface 29.

Figure 4:
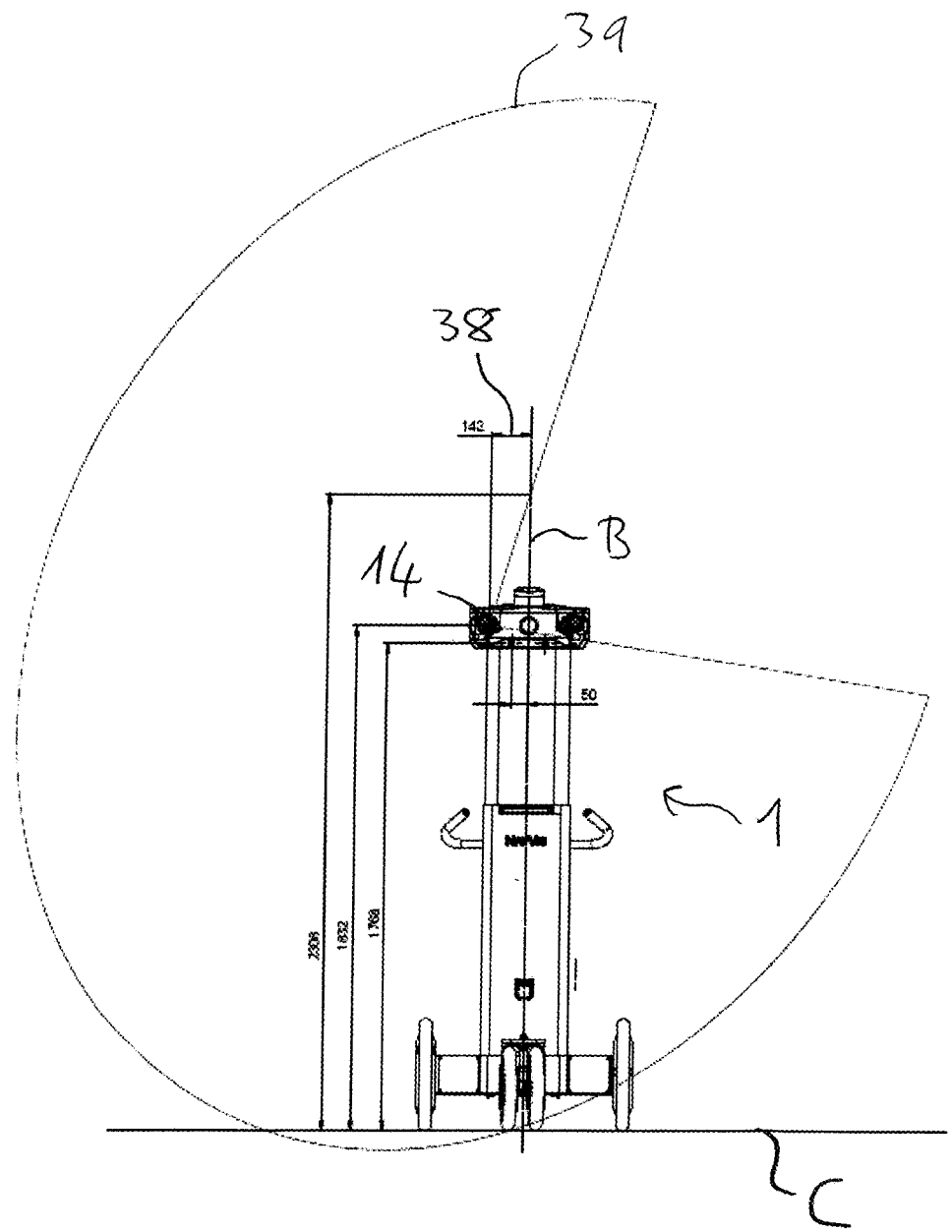
FIG. 4 illustrates the orientation of the second single scanner, FIG. 5 further illustrates the orientation of the second single scanner, FIG. 6 further illustrates the orientation of the second single scanner, FIG. 7 further illustrates the orientation of the second single scanner.

With reference to FIG. 4, the position of the second single scanner 14, i.e. the upper right-hand single scanner with respect to the forward movement direction A, will be explained. FIG. 4 shows a view of the mobile apparatus 1 from the front, perpendicular to the centre plane B of the mobile apparatus 1. The lateral distance 38 of the second single scanner 14 from the centre plane B is 142 mm. The height of the second single scanner 14 in relation to a horizontal plane C, on which the wheels 9, 10 of the mobile apparatus 1 stand, is in a range between about 1300 mm and about 1900 mm. The height of the second single scanner 14 can be adjusted by means of the adjustment mechanism 5.

The arrangement and orientation of the third single scanner 15, i.e. the upper left single scanner, is mirror-symmetrical with respect to the centre plane B to the arrangement and orientation of the second single scanner 14.

Figure 5:
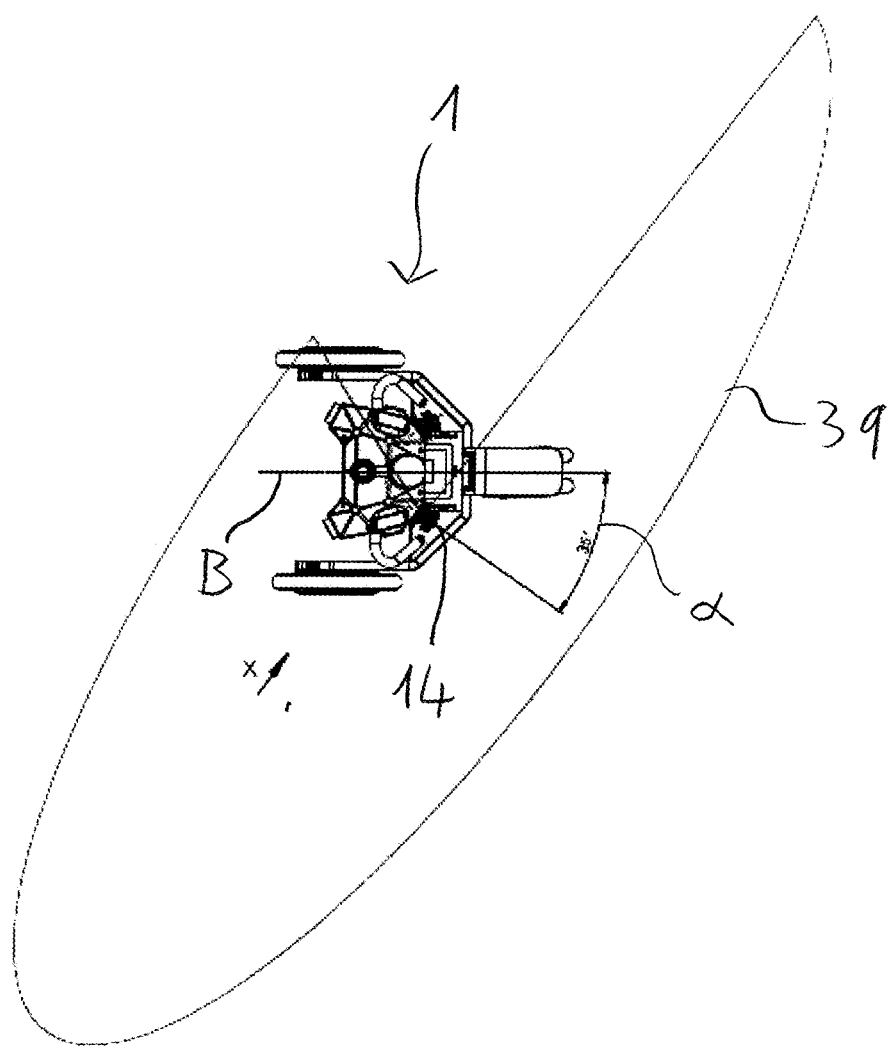

FIG. 5 shows a plan view of the mobile apparatus 1. Furthermore, the second plane 39 defined by the second signal beams 32 of the second scanner 16 is shown. It encloses an angle α of 35° with the centre plane B.

Figure 6:
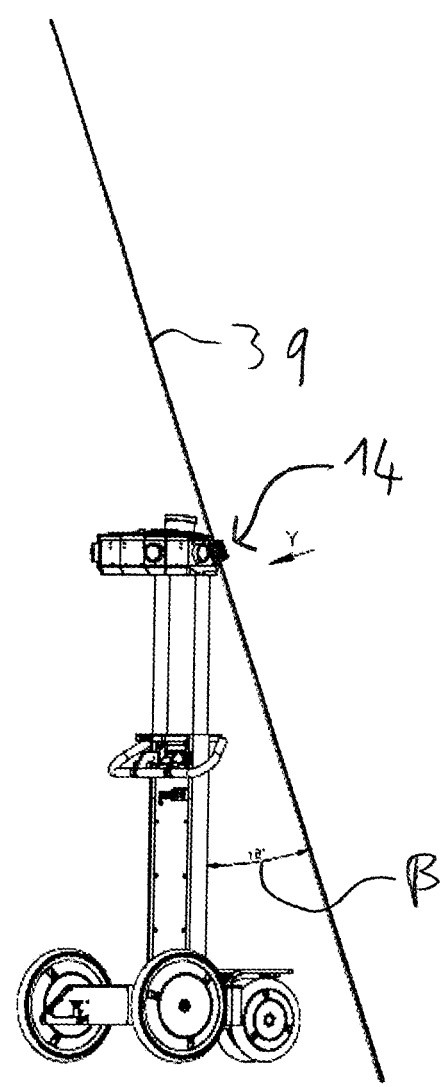

FIG. 6 shows a view from the direction X of FIG. 5. This view of FIG. 6 shows the angle of attack β of the second single scanner 14 to the vertical. This angle of attack β is 18°.

Figure 7:
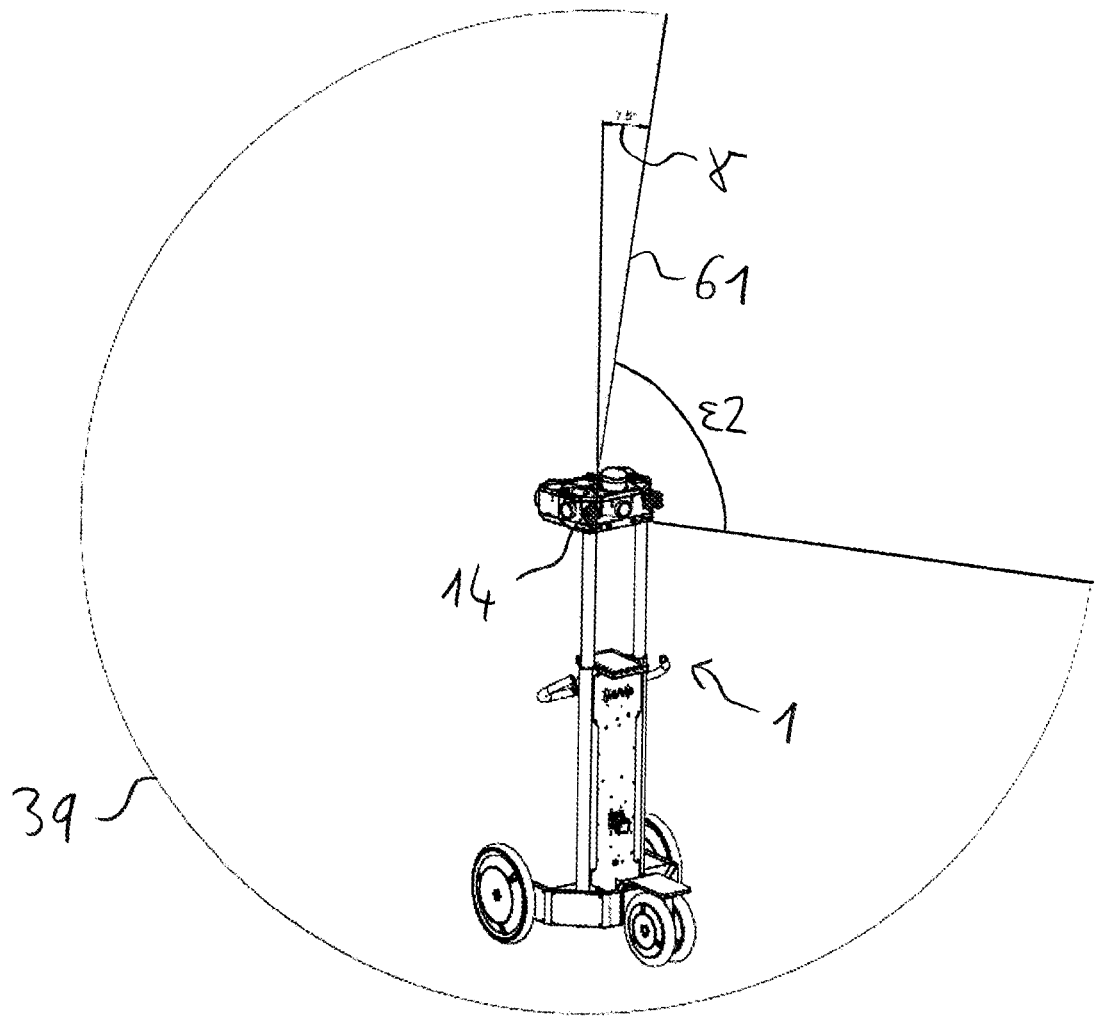

In FIG. 7 a view from the direction Y of FIG. 6 is shown, i.e. a view against a normal of the second plane 39. From this view the orientation of a so-called second blind angle ε2 of the area of the second plane 39 captured by the second single scanner 14 is derived. The single scanners 13 to 15 used in the present embodiment do not cover the full angular range of 360° of a plane, but only an angular range of 270°. This results in a second blind angle ε2 of 90° in the scanned second plane 39. The view shown in FIG. 7 shows that the angle γ formed between one leg 61 of the second blind angle ε2 and the vertical is 7.5°. In other exemplary embodiments this angle γ can be in the range of 5° to 10°. The angle γ lies outside the second blind angle ε2.

Due to the symmetrical arrangement of the third single scanner 15 in relation to the second single scanner 14, the third blind angle of the third single scanner 15 is aligned symmetrically. This means that the two legs of the blind angles of the second and third single scanners 14, 15 intersect at the centre plane B above the mobile apparatus 1. This point of intersection is shown in FIG. 4. It is at a height of 2308 mm, for example.

Figure 8:
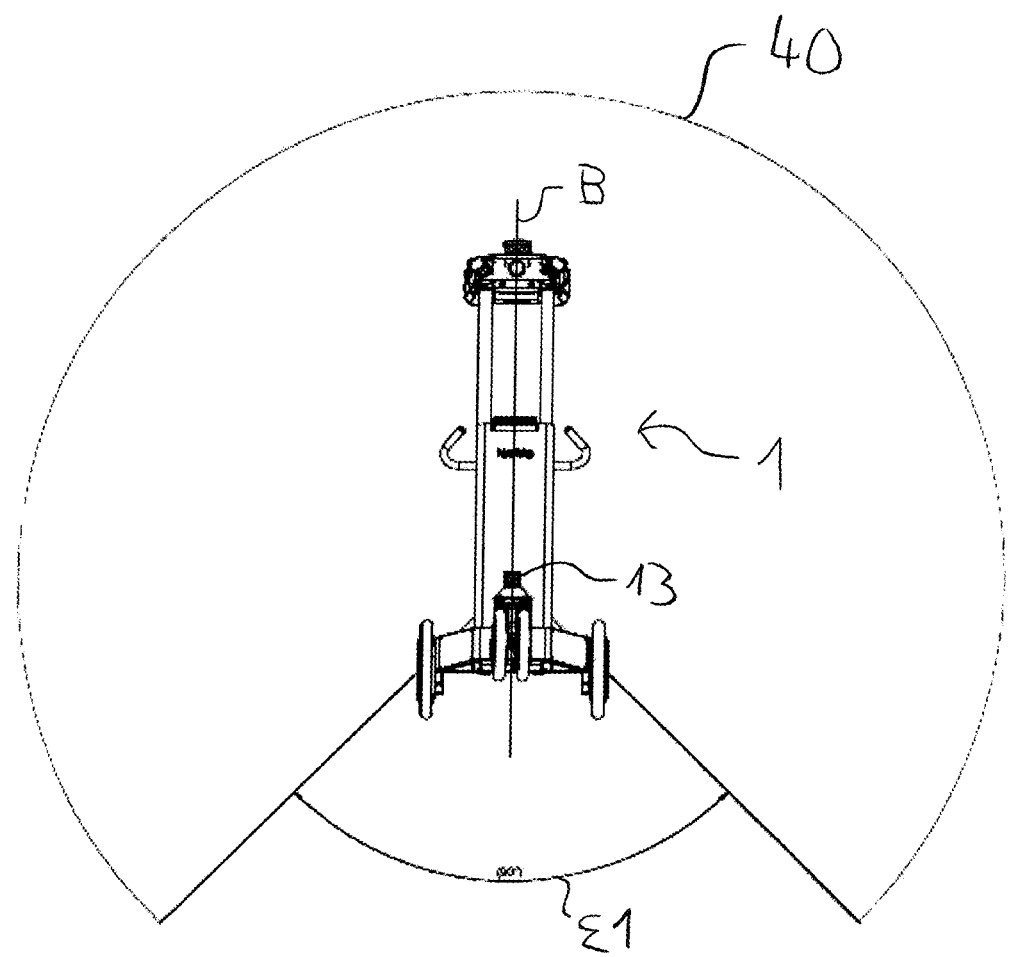
FIG. 8 illustrates the emission range of the first single scanner.

FIG. 8 shows the orientation of the first blind angle ε1 when viewed from the Z direction (see FIG. 9) parallel to the first axis of rotation of the first single scanner 13 for this first single scanner 13. Here, the first blind angle ε1 is aligned symmetrically to the centre plane B. It extends backwards in relation to the forward movement direction A, so that the area of the first plane 40 of the first single scanner 13 is completely captured in the forward movement direction A.

Figure 9:
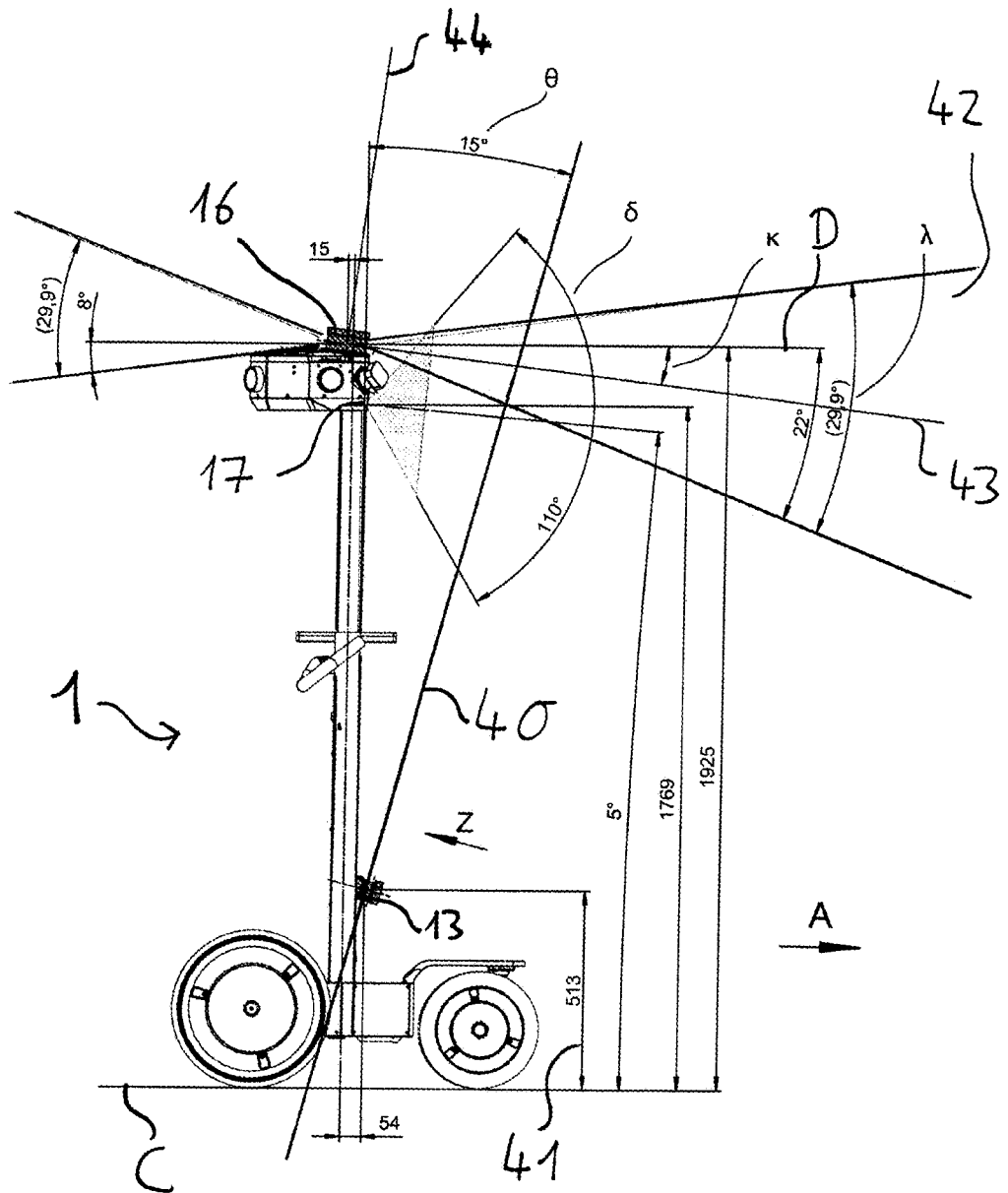
FIG. 9 illustrates the emission directions of the scanners of the embodiment of the mobile apparatus.

With reference to FIG. 9, further details regarding the alignment of the various devices of the mobile apparatus are explained. FIG. 9 shows a side view of the mobile apparatus 1. The vertical distance 41 of the first single scanner 13 from the horizontal plane C, i.e. the height of the first single scanner 13, is 513 mm in the embodiment shown here. The first plane 40 defined by the first signal beams 21 of the first single scanner 13 is tilted forward with respect to the direction of forward movement A by the angle θ in relation to the vertical. The angle θ is in a range of 10° to 20°. In particular, it is 15°. The first camera 17 facing forward is optional. It can be a stereo camera with an angle of aperture δ of 110°, this angle of aperture δ also being tilted slightly downwards in relation to the horizontal.

Furthermore, the orientation and the geometry of the second signal beams 32 of the multiple scanner 16 are shown in FIG. 9: As explained above, the second signal beams 32 generate an emission fan 42. This emission fan 42 is symmetrical with respect to a centre axis 43. The centre axis 43 is perpendicular to the second axis of rotation 44 of the multiple scanner 16. The centre axis 43 is inclined downwards by the angle κ with respect to a horizontal plane D which passes through the multiple scanner 16, more precisely through the starting point of the emission fan 42. This means that the second axis of rotation 44 is also tilted forward by the same angle κ in relation to a vertical plane in the direction of forward movement A.

The angle of aperture λ of the emission fan 42 is about 30°, so that a smaller area above the horizontal plane D and a larger area below the horizontal plane D is captured by emission fan 42 in the forward movement direction A. Against the forward movement direction A, the situation is reversed. A smaller area is captured below the horizontal plane D, while a larger area is captured above the horizontal plane D.

Figure 10:
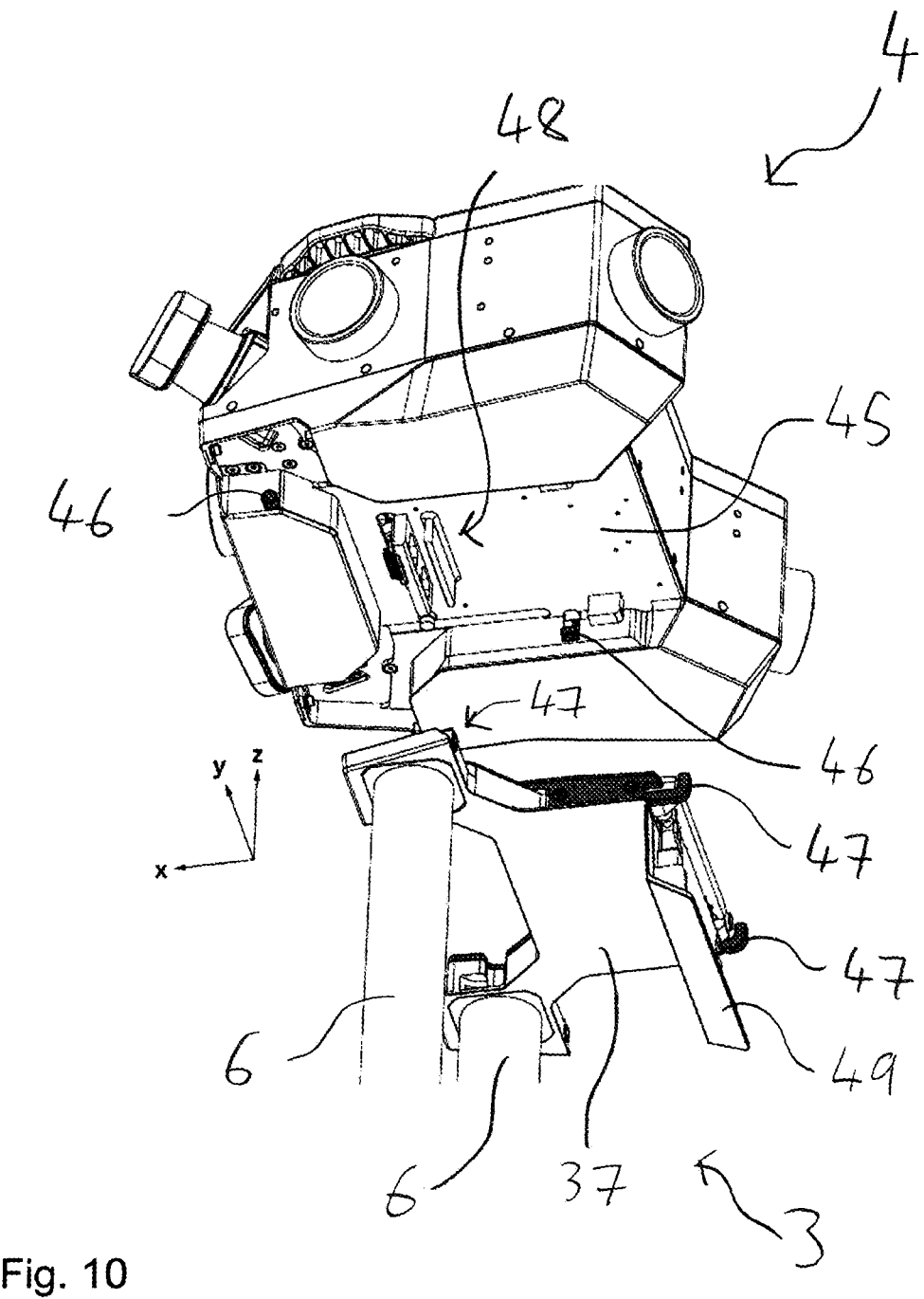
FIG. 10 shows the frame head in a state separate from the base element.
Figure 11:
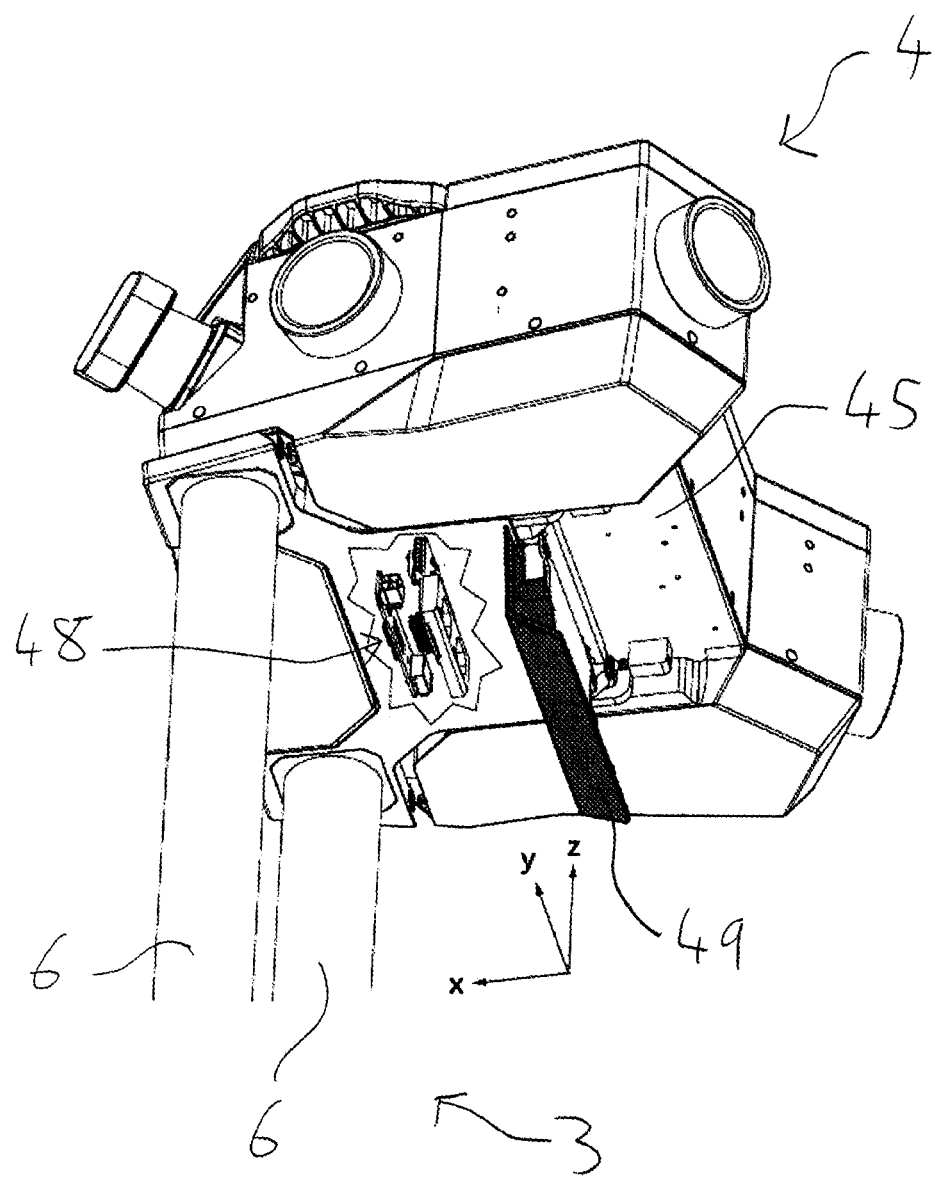
FIG. 11 shows an intermediate state when the frame head is placed on the base element.
Figure 12:
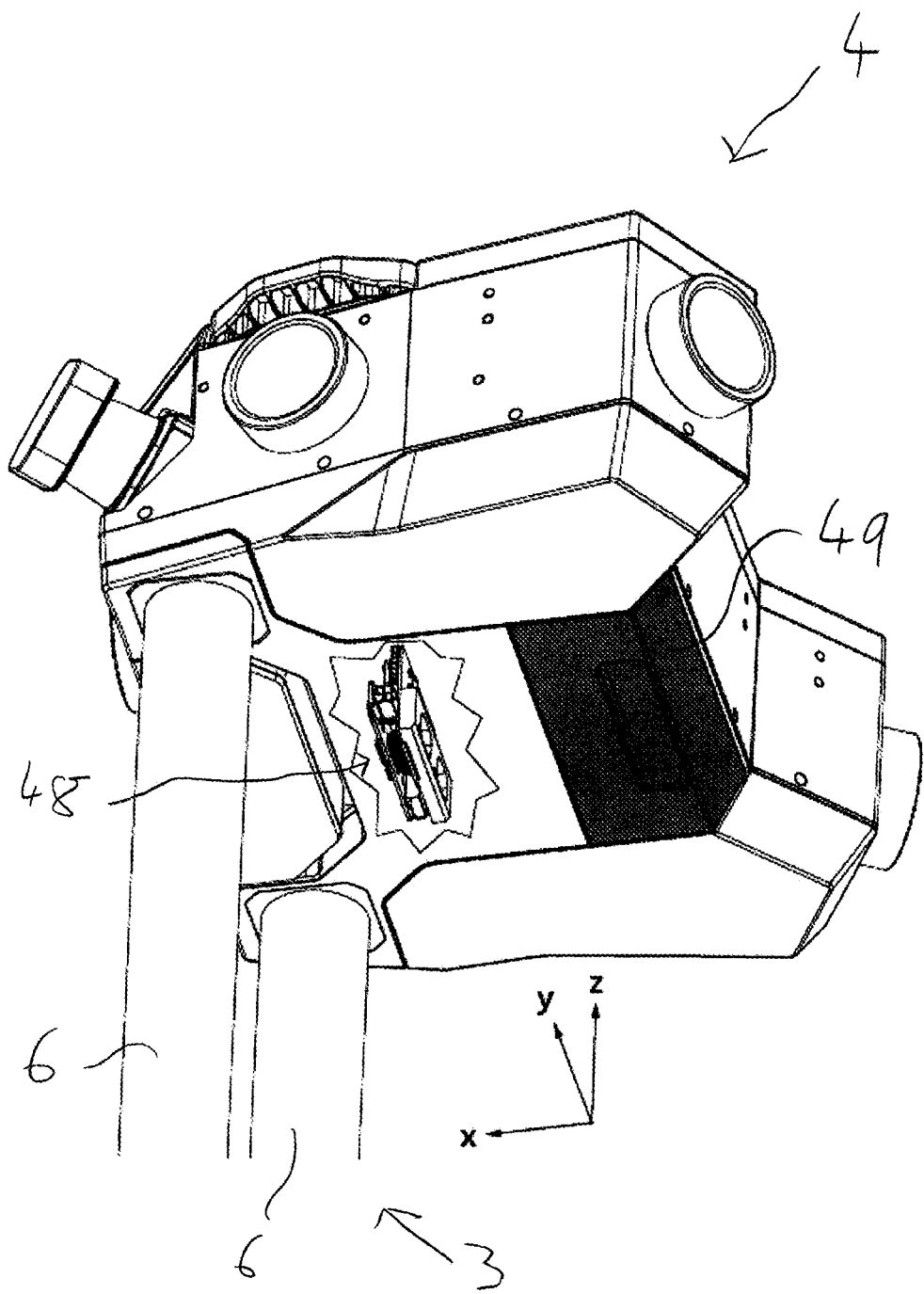
FIG. 12 shows the frame head in a state placed on the base element.

With reference to FIGS. 10 to 12, the coupling of the frame head 4 to the mounting plate 37 of the base element 3 will be explained. The frame head 4 has a cross beam 45, to which the multiple scanner 16, the second 14 and third single scanner 15, as well as the cameras 17 and 18 are attached in such a way that they have a fixed geometrical arrangement to each other.

Even if the vertical position of the frame head 4 is changed, this geometrical arrangement is maintained, so that the mobile apparatus 1 does not need to be calibrated after a height adjustment of the frame head 4.

The frame head 4 has support pins 46. Corresponding to these support pins 46, the mounting plate comprises 37 guides 47, especially plastic guides. When placing the frame head 4 on the mounting plate 37, the support pins 46 are inserted into the guides 47. In this way it is achieved that, after the placement of the frame head 4, a sufficiently accurate pre-positioning of the frame head 4 relative to the mounting plate 37 is achieved for the mechanical and electrical coupling. For the electrical coupling of the frame head 4 with the mounting plate 37, a plug connection 48 is provided on the mounting plate 37 and the underside of the cross beam 45 of the frame head 4. The pre-positioning includes a sufficiently precise alignment for the mechanical coupling between at least one positioning pin in the frame head 4 and the associated positioning sockets in the mounting plate 37 for the subsequent coupling process. In addition, boards for electrical coupling are pre-positioned sufficiently to ensure a secure connection between spring contact pins on the board in the frame head 4 and the associated contact surfaces on the board of the mounting plate 37.

FIG. 11 shows the state in which the frame head is pre-positioned for mechanical and electrical coupling. In this case the frame head 4 is placed on the mounting plate 37.

For further fixing of the frame head 4 on the mounting plate 37, a handle lever 49 is provided at the mounting plate 37. The handle lever 49 can be swivelled about a transverse axis. Starting from the arrangement shown in FIG. 11, the handle lever 49 is swivelled upwards for the mechanical and electrical coupling of the frame head 4 to the base element 3 and engages in the position shown in FIG. 12. In this state there is a secure mechanical and electrical coupling between the frame head 4 and the mounting plate 37. In the coupled state the positioning pins of the frame head 4 and the associated positioning sockets in the mounting plate 37 are fixedly aligned with each other in the degrees of freedom Y and Z with repeat accuracy. When swivelling the handle lever 49 from the state shown in FIG. 11 to the state shown in FIG. 12, a clamping lever geometry is actuated, which ensures that the positioning pins of the frame head 4 are also firmly positioned in the axial direction X. At the same time, the clamping lever geometry ensures that a preload of spring contact pins for the electrical connection when the plug connection 48 is made is safely established. In this state, the frame head 4 and the devices of the frame head 4 directly or indirectly attached to the cross beam 45 have a fixed geometrical arrangement to each other. If the vertical distance of the frame head 4 from the base element 3 is now changed by means of the adjustment mechanism 5, a new calibration is not necessary.

Figure 13:
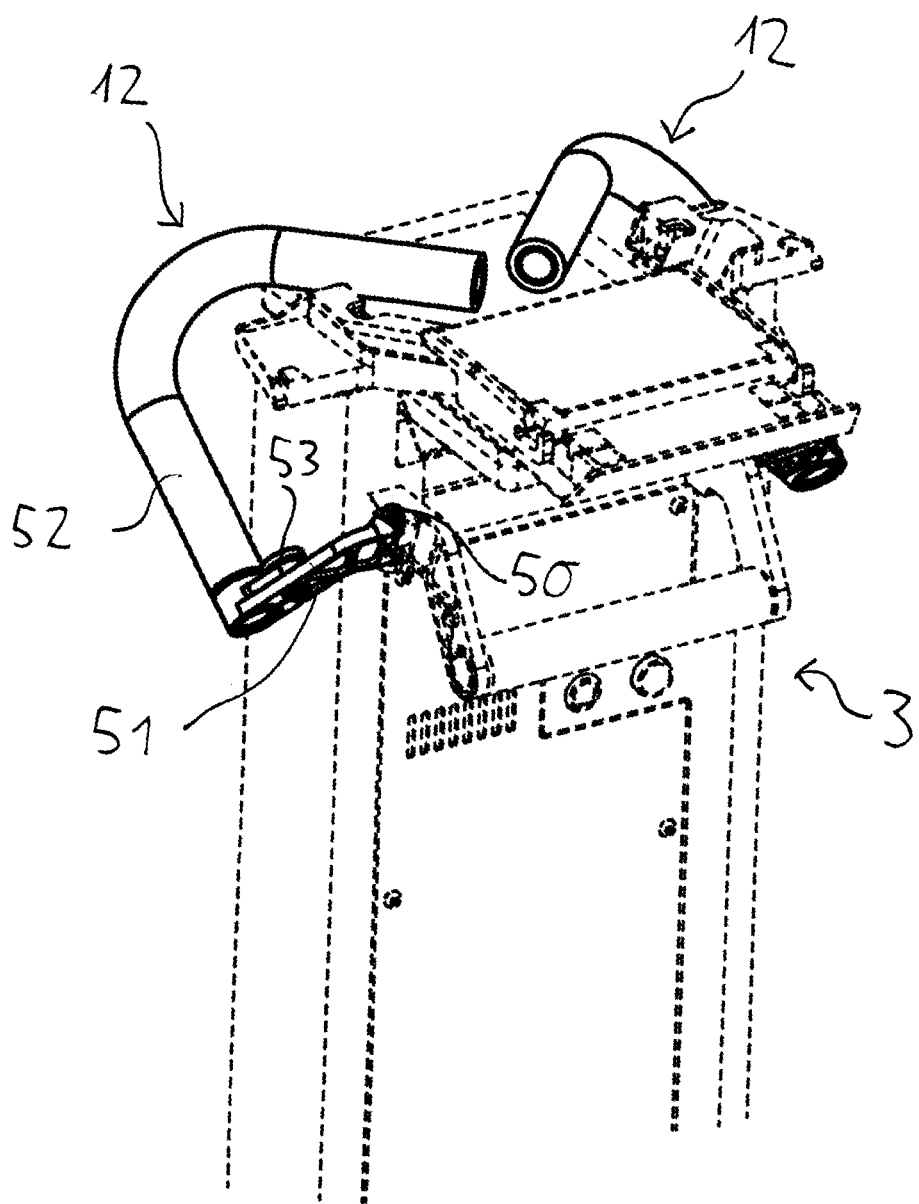
FIG. 13 shows the handles in a first state.
Figure 14:
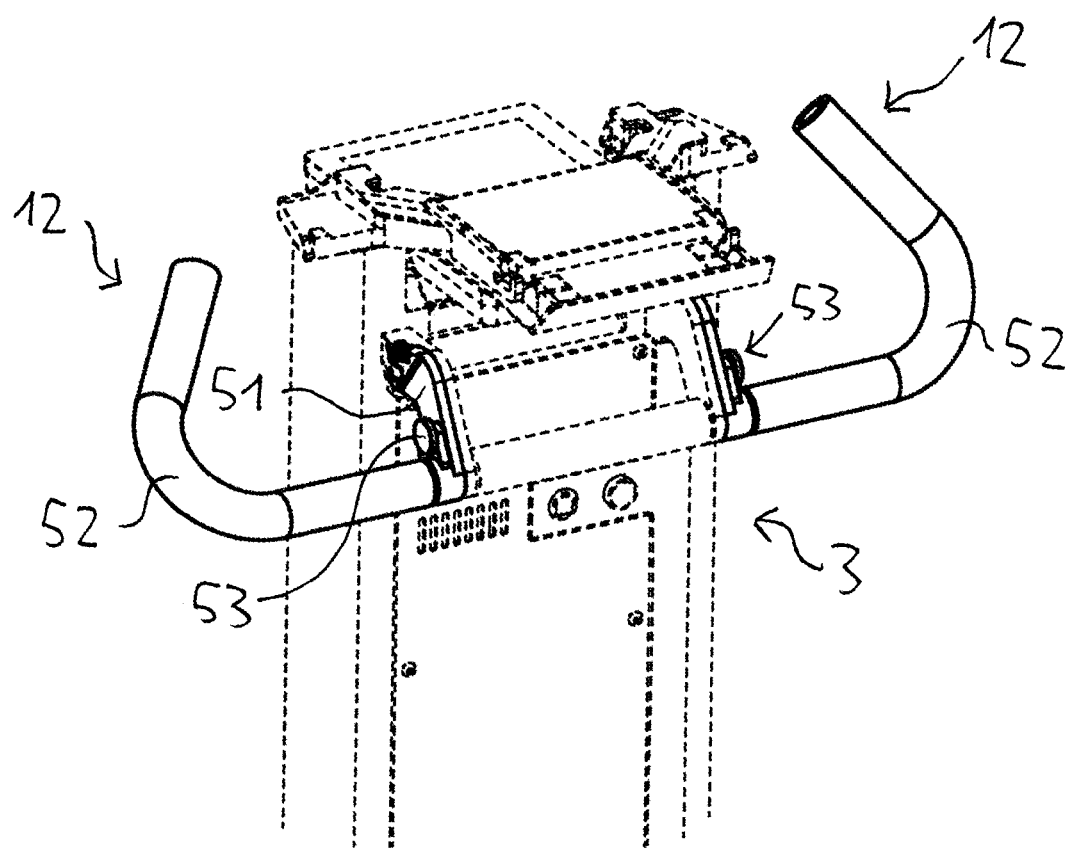
FIG. 14 shows the handles in a second state.

With reference to FIGS. 13 and 14, the arrangement of the handles 12 on the base element 3 will be explained in detail.

FIG. 13 shows an initial state of the handles 12, in which they are swivelled in. In this state the width of the middle part of the base element 3 is smaller. The handles 12 can be brought into this state in order to pass through a constriction at medium height. This state is also advantageous if the mobile apparatus 1 is to be disassembled and transported. At the same time, the handles 12, which are appropriately padded for example, can protect the surface of the screen 19 from damage in this folded-in position.

In order that the handles 12 can be brought into the swivelled-in state, they are connected to the base element 3 via a swivel axis 50. A locking element 51 is arranged such that it can swivel at the swivel axis 50. The swivel axis 50 is located on one side of the locking element 51. A handle element 52 is rigidly connected to the locking element 51 on the other side of the locking element 51. The handle element 52 first extends vertically from the end of the locking element 51, then runs in a bend and then extends in a straight line again over a specific section. The bending of the handle element 52 in conjunction with the orientation of the pivot axis 50 is such that in the swivelled-in state, as shown in FIG. 13, the handle element 52 can be swivelled towards the base element 3 without the base element 3 or devices attached to the base element 3 hindering the swivelling-in of the handle 12.

To bring the handles 12 into the operating position shown in FIG. 14, the locking element 51 is swivelled together with the handle element 52 about the swivel axis 50 in the direction of a stop face of the base element 3. In doing so, the handle elements 52 move outwards until they reach the state shown in FIG. 14. In this state the locking element 51 rests against the stop face of the base element 3. The base element 3 and the locking element 51 have a locking mechanism 53 by which the locking element 51 can be securely and fixedly connected to the base element 3. In the locked state the handle 12 cannot be swivelled into the operating position shown in FIG. 13. In the state shown in FIG. 14, an operator can therefore move the mobile apparatus 1 by means of the handles 12, in particular roll it over a ground surface via the rollers 9 and 10.

With reference to FIGS. 15 to 18 in conjunction with FIGS. 1 and 2, the mounting of the outer wheels 9 on the base element 3 in conjunction with a stand apparatus 54 will be explained:

The outer wheels 9 are each attached to a longitudinal beam 57 of the base element 3 via a thru axle 56. The longitudinal members 57 each have openings 58 into which the thru axles 56 can be inserted. The quick-release devices 55 can be used to clamp the thru axles 56 in the openings 58, so that the outer wheels 9 are held firmly on the longitudinal members 57. It is possible to insert the outer wheels 9 with their thru axle 56 into the corresponding opening 58 from the outside or from the inside. In this way the distance between the outer wheels 9 in the transverse direction can be changed. If the outer wheels 9 are fixed to the inside of the longitudinal beams 57, the total transverse extent of the mobile apparatus 1 is less, and therefore it is possible to pass through narrow points.

With reference to FIGS. 15 to 18, it will now be explained how an outer wheel 9 is attached to the longitudinal beam 57.

Figure 15:
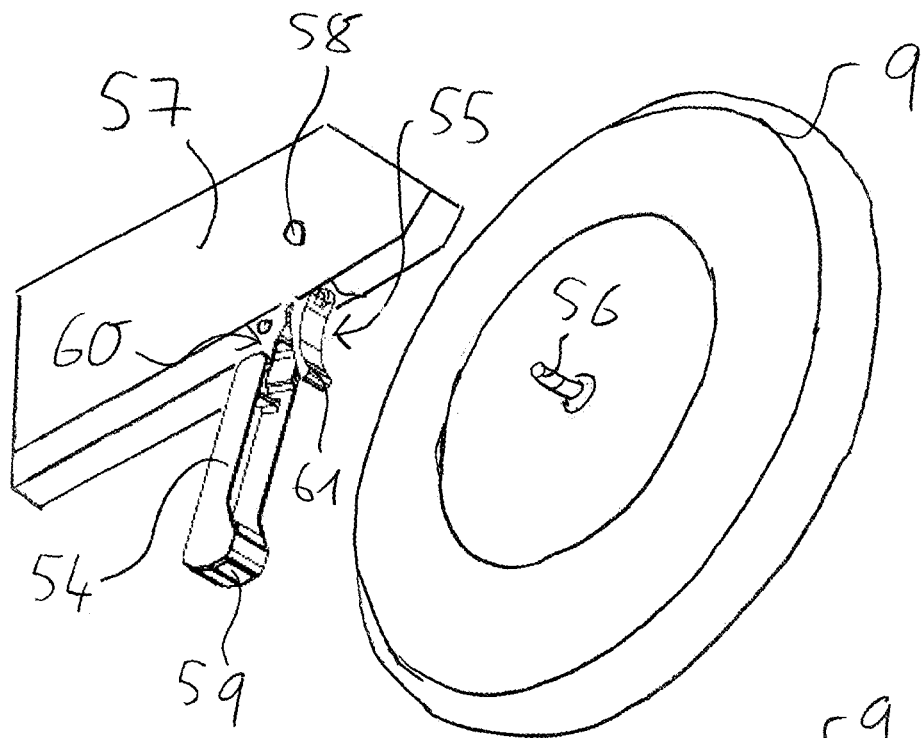
FIG. 15 shows the stand apparatus and the quick-release device in an open position with the wheel dismounted.

A stand apparatus 54 is arranged on the base element 3. As shown in FIG. 15, this stand apparatus 54 can be swivelled downwards. The length of the stand apparatus 54 is such that it is larger than the radius of the outer wheel 9. If the mobile apparatus 1 is thus standing in a horizontal plane C and the stand apparatus 54 is swivelled downwards, the lower end 59 of the stand apparatus 54 hits the horizontal plane C, i.e. the ground surface on which the mobile apparatus 1 is standing. If the stand apparatus 54 is swivelled further, for example by moving the mobile apparatus 1 further forward while the lower end 59 of the stand apparatus 54 touches the ground surface, the mobile apparatus 1 is lifted so that the outer wheels 9 no longer touch the ground surface. In this way the mobile apparatus 1 is jacked up.

Furthermore, the stand apparatus 54 is equipped with a coupling mechanism 60, which couples the stand apparatus 54 to the quick-release device 55 for locking the outer wheel 9. This coupling mechanism 60 has the effect that when the stand apparatus 54 is swivelled out, a lever 61 of the quick-release device 55 is swivelled at the same time, so that the quick-release device 55 opens and releases the thru axle 56 of the outer wheel 9. The outer wheel 9 can now be removed or, if it was not attached to the longitudinal beam 57, it can be mounted in this state as shown in FIG. 15.

Figure 16:
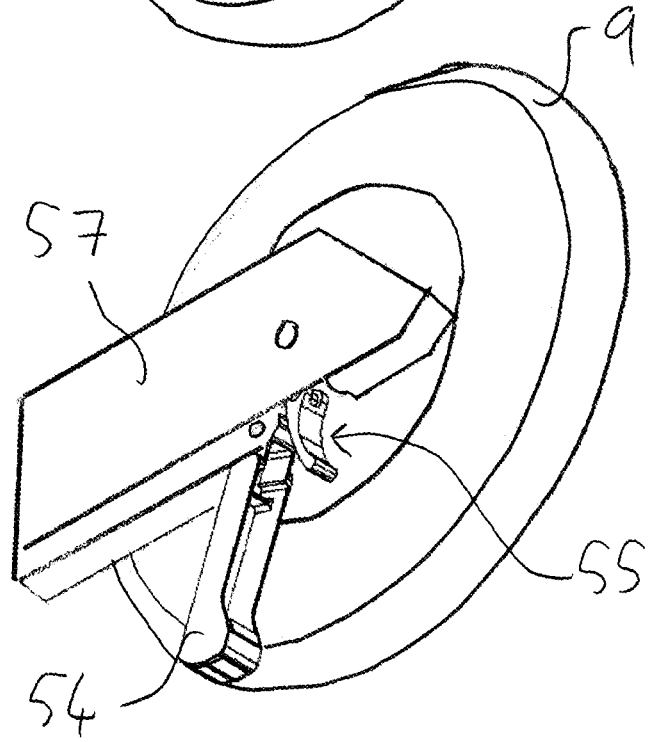
FIG. 16 shows the stand apparatus and the quick-release device with an attached wheel.
Figure 17:
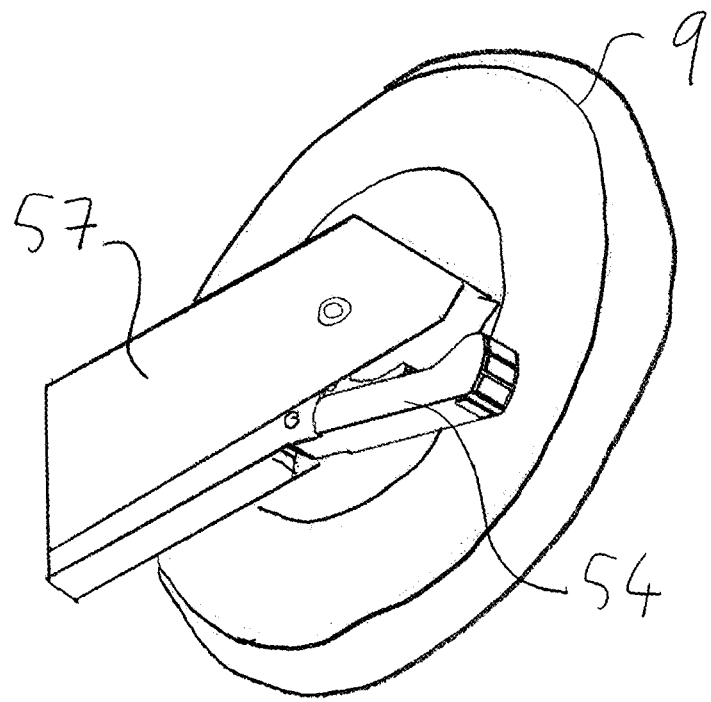
FIG. 17 shows the stand apparatus in an intermediate state during the lowering of the mobile apparatus.
Figure 18:
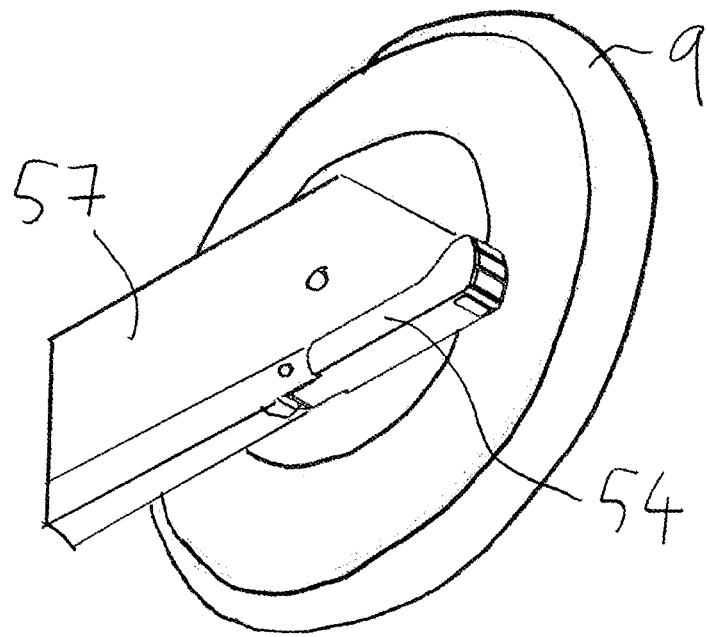
FIG. 18 shows the stand apparatus in a fully lowered state of the apparatus with the quick-release device closed.

The thru axle 56 is now inserted into the opening 58 of the longitudinal beam 57 as shown in FIG. 16. Now the stand apparatus 54 is swivelled back onto the longitudinal beam 57. In this way the mobile apparatus 1 is lowered so that it comes to a stop again on the outer wheel 9. As shown in FIGS. 16 to 18, the coupling mechanism 60 transfers the pivoting of the stand apparatus 54 to the quick-release device 55, so that it is automatically closed when the stand apparatus 54 is pivoted. In the state shown in FIG. 18 the stand apparatus 54 is completely folded in. In this state, the quick-release device 55 is also closed. In this condition it locks the outer wheel 9 firmly on the longitudinal beam 57.

An embodiment of the method according to the invention will be explained hereinafter:

The mobile apparatus 1 is first assembled and brought into the state shown in FIG. 1, in which the outer wheels 9 are arranged externally on the longitudinal beam 57. The mobile apparatus 1 is then brought into the object space to be captured. This is, particularly, the interior of a building. The three single scanners 13 to 15, the multiple scanner 16 and the cameras 17 and 18 are put into operation together with the other electronic devices of the mobile apparatus 1.

Controlled by the control unit 26, the emission devices of the single scanners, i.e. the first emission device 20 of the first single scanner and the corresponding emission units of the second and third single scanners 14, 15 emit signal beams comprising signal pulses. At the same time, the scanning devices rotate the emission directions of the signal beams about the respective axes of rotation of the single scanners 13, 14, 15. In this way, the planes are captured as explained with reference to FIGS. 4 to 9. The receivers of the single scanners 13, 14, 15 detect reflected rays that were generated by reflection of the signal pulses of the signal beams. The signals detected by the receivers are transmitted to the evaluation device 28 together with the control signals of the control unit 26.

Furthermore, the multiple scanner 16, controlled by the control unit 26, emits a large number of second signal beams 32 into an emission fan 42, as explained with reference to FIGS. 3 and 9. The second emission units 31 are rotated about the second axis of rotation 44 by means of the second scanning device 36. The second reflection beams 34 detected by the second receiver 35 are transmitted to the evaluation device 28 together with the control signals from the control unit 26.

Meanwhile, the mobile apparatus 1 is rolled over a ground surface by an operator, for example. The evaluation device 28 now continuously generates graphical representations in real time from at least the reflected rays 34 detected by the second receiver 35 and displays them on the screen 19. These graphical representations indicate in particular the areas of the object space through which the mobile apparatus 1 can be moved. Alternatively or additionally, it can be shown through which areas of the object space the mobile apparatus 1 has already been moved. The operator can thus determine very clearly whether the object space has already been completely captured. For example, the graphical representation may contain, in one colour, areas through which the mobile apparatus 1 is to be moved and, in another colour, the areas through which the mobile apparatus 1 has already been moved. In particular, a ground surface area over which the mobile apparatus 1 can be moved is coloured.

Furthermore, the control unit 26 controls the cameras 17 and 18 in such a way that individual images are captured which can be combined to form a panoramic image. The evaluation device 28 can also use these images as a supplement to generate the graphical representation which is displayed on the screen 19. If real-time processing is still possible, the signals from the receivers of the three single scanners 13 to 15 can also be used additionally to generate the graphical representation.

In this way, an operator drives the mobile apparatus 1 on a ground surface through the object space to be captured. All signals and data captured are also transmitted via the data interface 29 to the storage device 30 or wirelessly to an external data memory. This data is then used during post-processing to generate a very precise three-dimensional point cloud of the object space to be captured.

If the mobile apparatus 1 has to pass through a narrow point, such as a narrow door, the outer wheels 9 can be repositioned to an inner position as explained above without interrupting the scanning process. Furthermore, if necessary, the mobile apparatus 1 can also be tilted or swivelled without interrupting the scanning process. Even differences in height, for example when driving up ramps, can be overcome without interrupting the scanning processes.

LIST OF REFERENCE NUMERALS

1 Mobile apparatus
2 Frame
3 Base element
4 Frame head
5 Adjustment mechanism
6 Adjustable columns
7 Column guide
8 Sensor
9 Outer wheels
10 Middle wheels
11 Energy Store
12 Handles
13 First single scanner
14 Second single scanner
15 Third single scanner
16 Multiple scanner
17 First camera
18 Further cameras
19 Screen
20 First emission unit
21 First signal beam
22 Object
23 First reflected ray
24 First receiver
25 First scanning device
26 Control unit
27 Timer
28 Evaluation device
29 Data interface
30 Storage device
31 Second emission units
32 Second signal beams
33 Object
34 Second reflected ray
35 Second receiver
36 Second scanning device
37 Mounting plate
38 Lateral distance
39 Second plane
40 First plane
41 Vertical distance
42 Emission fan
43 Centre axis
44 Second rotation axis
45 Cross beam
46 Support pins
47 Guides
48 Plug connection
49 Handle lever
50 Swivel axis
51 Locking element
52 Handle element
53 Locking mechanism
54 Stand apparatus
55 Quick-release devices
56 Thru axle
57 Longitudinal beam
58 Openings
59 Lower end
60 Coupling mechanism
61 First leg
A Forward movement direction
B Middle plane
C Horizontal plane
D Horizontal plane

The invention claimed is:

1. A mobile apparatus for capturing an object space, having a frame,
at least one single scanner mounted on the frame, comprising:
a first emission unit for generating a first signal beam in a first emission direction,
a first receiver for detecting a first reflected ray generated by reflection of the first signal beam on at least one object of the object space, and
a first scanning device for changing the first emission direction of the first signal beam,
a multiple scanner mounted on the frame above the at least one single scanner, comprising:
a plurality of second emission units integrated in one component for generating a plurality of second signal beams in second emission directions,
a second receiver for detecting second reflected rays generated by reflections of the second signal beams on one or more objects in the object space, and
a second scanning device for changing the second emission directions of the second signal beams,
an evaluation device, which is coupled for data exchange at least to the second receiver and which is configured to generate and output in real time, at least from the second reflected rays detected by the second receiver, a graphical representation of a trajectory of the mobile apparatus, wherein in the graphical representation a region in which the mobile apparatus has been moved is indicated with a first color and a region in which the mobile apparatus can be moved is indicated with a second color, and
a data interface, which is coupled for data exchange at least to the first receiver and which is configured to output data that has been generated, at least from the first reflected ray detected by the first receiver, to a memory device for post-processing.

2. The mobile apparatus according to claim 1, wherein the second emission directions are oriented in a fan shape such that an emission fan having a center axis is formed.

3. The mobile apparatus according to claim 1, wherein the mobile apparatus further comprises at least one second single scanner having a third emission unit for generating a third signal beam in a third emission direction, a third receiver for detecting a third reflected ray generated by reflection of the third signal beam on an object in the object space, and a third scanning device for changing the third emission direction of the third signal beam.

4. The mobile apparatus according to claim 3, wherein the third scanning device is configured to rotate the third emission direction of the third signal beam about a third axis of rotation perpendicular to the third emission direction such that a second plane is scanned.

5. The mobile apparatus according to claim 4, wherein the mobile apparatus further comprises at least one third single scanner comprising a fourth emission unit for generating a fourth signal beam in a fourth emission direction, a fourth receiver for detecting a fourth reflected ray generated by reflection of the fourth signal beam on an object of the object space, and a fourth scanning device for changing the fourth emission direction of the fourth signal beam.

6. The mobile apparatus according to claim 5, wherein the fourth scanning device is configured to rotate the fourth emission direction of the fourth signal beam about a fourth axis of rotation perpendicular to the fourth emission direction such that a third plane is scanned.

7. The mobile apparatus according to claim 6, wherein the second single scanner and the third single scanner are arranged and oriented symmetrically with respect to a center plane of the mobile apparatus.

8. The mobile apparatus according to claim 7,
wherein the second and third planes are scanned in an angular range smaller than 360° such that a second blind angle is formed in the second plane and a third blind angle is formed in the third plane, and
wherein when viewed against a normal of the second plane, a first leg of the second blind angle encloses a third angle with a vertical which is in a range of 5° to 10° and which is outside the second blind angle.

9. The mobile apparatus according to claim 6, wherein a plurality of wheels is mounted on the frame, the plurality of wheels configured such that the frame is mobile and the mobile apparatus can be rolled over a ground surface;
wherein at least one of the frame and the plurality of wheels define a forward movement direction for capturing the object space;
wherein a second axis of rotation of the multiple scanner is tilted forward in a direction of forward movement; and
wherein at least one of the second and third planes is oriented backwards with respect to the direction of forward movement, such that at least one of the third and fourth emission directions of at least one of the third and fourth signal beams of at least one of the second and third single scanners is oriented obliquely downwards in the forward movement direction at least temporarily.

10. The mobile apparatus according to claim 1, wherein the mobile apparatus further comprises:
at least one second single scanner having a third emission unit for generating a third signal beam in a third emission direction, a third receiver for detecting a third reflected ray generated by reflection of the third signal beam on an object in the object space, and
at least one third single scanner having a fourth emission unit for generating a fourth signal beam in a fourth emission direction, a fourth receiver for detecting a fourth reflected ray generated by reflection of the fourth signal beam on an object of the object space,
wherein the second single scanner and the third single scanner are arranged and oriented symmetrically with respect to a center plane of the mobile apparatus.

11. The mobile apparatus according to claim 1, wherein the frame has a base element and a frame head, a height of the frame head being variable via an adjustment mechanism.

12. The mobile apparatus according to claim 11, wherein a plurality of wheels is mounted on the base element of the frame, the plurality of wheels configured such that the frame is mobile and the mobile apparatus can be rolled over a ground surface.

13. The mobile apparatus according to claim 1, wherein a plurality of wheels is mounted on the frame, the plurality of wheels configured such that the frame is mobile and the mobile apparatus can be rolled over a ground surface;
wherein at least one of the frame and the plurality of wheels define a forward movement direction for capturing the object space; and
wherein a second axis of rotation of the multiple scanner is tilted forward in a direction of forward movement.

14. The mobile apparatus according to claim 13, wherein a first plane defined by the first signal beam of the at least one single scanner is oriented tilted forward in the direction of forward movement, such that the first emission direction of the first signal beam of the at least one single scanner is oriented obliquely upwards in the direction of forward movement at least temporarily.

15. The mobile apparatus according to claim 13, wherein at least one stand apparatus is mounted on the frame, the stand apparatus configured to raise the frame such that at least one wheel of the plurality of wheels no longer touches the ground surface, and can be lowered such that the frame can move freely on the plurality of wheels.

16. The mobile apparatus according to claim 15,
wherein at least one wheel of the plurality of wheels is mounted on the frame via a quick-release device by which the at least one wheel of the plurality of wheels can be locked; and
wherein the stand apparatus is coupled to the quick-release device in such a way that when the stand apparatus is actuated to lower the stand apparatus, the quick-release device is automatically closed and the at least one wheel of the plurality of wheels is thereby locked.

17. The mobile apparatus according to claim 1, wherein at least one wheel is mounted on the frame via a quick-release device by which the at least one wheel can be locked.

18. The mobile apparatus according to claim 1, wherein the frame comprises a base element configured as a backpack carrying frame and a removeable frame head.

19. The mobile apparatus according to claim 1, wherein a ground surface area over which the mobile apparatus can be moved is colored.

20. A method for capturing an object space using a mobile apparatus having a frame for moving the mobile apparatus in the object space, the method comprising:
emitting a plurality of signal beams in emission directions with a multiple scanner mounted on the frame,
detecting reflected rays generated by reflection of the plurality of signal beams on one or more objects of the object space, wherein the emission directions of the plurality of signal beams are changed by a scanning device configured for capturing the object space, and generating a graphical representation of a trajectory of the mobile apparatus wherein in the graphical representation a region in which the mobile apparatus has been moved is indicated with a first color and a region in which the mobile apparatus can be moved is indicated with a second color, wherein the graphical representation is output in real time at least from the reflected rays detected by the receiver.

21. The method according to claim 20, wherein at least one first single scanner emits a second signal beam in a second emission direction, a second receiver detects a second reflected ray which is generated by reflection of the second signal beam on an object of the object space, and the second emission direction of the second signal beam is changed by a second scanning device configured for capturing the object space.

22. The method according to claim 21, wherein:
at least a second single scanner emits a third signal beam in a third emission direction, a third receiver detects a third reflected ray generated by reflection of the third signal beam at an object of the object space, and the third emission direction of the third signal beam is changed to capture the object space; and
wherein the first single scanner and the second single scanner are arranged and oriented symmetrically with respect to a center plane of the mobile apparatus.

23. The method according to claim 20, wherein a ground surface area over which the mobile apparatus can be moved is colored.

24. A mobile apparatus for capturing an object space, the mobile apparatus comprising,
a frame,
at least one multiple scanner mounted on the frame, the at least one multiple scanner having,
 a plurality of emission units integrated in one component for generating a plurality of signal beams in emission directions,
 a receiver for detecting reflected rays generated by reflections of the plurality of signal beams on one or more objects in the object space, and
 a scanning device for changing the emission direction of the plurality of signal beams,
an evaluation device, which is coupled for data exchange at least to the receiver and which is configured to generate and output in real time, at least from the reflected rays detected by the receiver, a graphical representation of a trajectory of the mobile apparatus wherein in the graphical representation a region in which the mobile apparatus has been moved is indicated with a first color and a region in which the mobile apparatus can be moved is indicated with a second color, and
a data interface, which is coupled for data exchange at least to the receiver and which is configured to output data that has been generated, at least from the reflected ray detected by the receiver, to a memory device for post-processing.

* * * * *